US012542266B2

(12) United States Patent
Booy et al.

(10) Patent No.: US 12,542,266 B2
(45) Date of Patent: Feb. 3, 2026

(54) BENT PCB ION GUIDE FOR REDUCTION OF CONTAMINATION AND NOISE

(71) Applicant: DH Technologies Development Pte. Ltd., Singapore (SG)

(72) Inventors: Aaron Timothy Booy, Barrie (CA); James Hager, Concord (CA)

(73) Assignee: DH Technologies Development Pte. Ltd., Singapore (SG)

( * ) Notice: Subject to any disclaimer, the term of this patent is extended or adjusted under 35 U.S.C. 154(b) by 280 days.

(21) Appl. No.: 18/278,544

(22) PCT Filed: Feb. 23, 2022

(86) PCT No.: PCT/IB2022/051607

§ 371 (c)(1),
(2) Date: Aug. 23, 2023

(87) PCT Pub. No.: WO2022/180550

PCT Pub. Date: Sep. 1, 2022

(65) Prior Publication Data

US 2024/0290600 A1 Aug. 29, 2024

Related U.S. Application Data

(60) Provisional application No. 63/153,646, filed on Feb. 25, 2021.

(51) Int. Cl.
*H01J 49/06* (2006.01)

(52) U.S. Cl.
CPC .................................. *H01J 49/062* (2013.01)

(58) Field of Classification Search
USPC .......................................................... 250/292
See application file for complete search history.

(56) References Cited

U.S. PATENT DOCUMENTS

| | | | | |
|---|---|---|---|---|
| 6,614,021 | B1 | 9/2003 | Kalinitchenko | |
| 11,119,069 | B2 * | 9/2021 | Ibrahim .............. | H01J 49/4225 |
| 11,209,393 | B2 * | 12/2021 | Garimella ........... | H01J 49/0027 |
| 2014/0008530 | A1 | 1/2014 | Whitehouse et al. | |
| 2014/0299766 | A1 | 10/2014 | Anderson et al. | |
| 2015/0060687 | A1 | 3/2015 | Kalinitchenko | |
| 2015/0228467 | A1 | 8/2015 | Grinfeld et al. | |
| 2015/0235832 | A1 | 8/2015 | Giles | |
| 2015/0303046 | A1 | 10/2015 | Ibrahim et al. | |
| 2019/0371591 | A1 * | 12/2019 | Taghioskoui ......... | H01J 49/063 |

OTHER PUBLICATIONS

International Search Report and Written Opinion, PCT/IB2022/051607, Dated Jun. 9, 2022, pp. 19.

* cited by examiner

*Primary Examiner* — Kiet T Nguyen

(74) *Attorney, Agent, or Firm* — Potomac Law Group, PLLC; Reza Mollaaghababa; Brian Hairston

(57) ABSTRACT

In one aspect, an ion guide for use in a mass spectrometer is disclosed, which comprises a first plurality of conductive electrodes disposed on a first surface, a second plurality of conductive electrodes disposed on a second surface, wherein the two surfaces are positioned relative to one another and shaped so as to provide a passageway having an inlet for receiving an ion beam and an outlet through which target ions of interest exit the passageway. The ion guide further includes an orifice formed in at least one of those surfaces through which neutral species and/or large ion clusters, when present in the ion beam, exit the ion guide.

20 Claims, 26 Drawing Sheets

BENT PCB ION GUIDE FOR REDUCTION OF CONTAMINATION AND NOISE

RELATED APPLICATION

This application is a 35 U.S.C. 371 national stage filing of International Application No. PCT/IB2022/051607, filed on Feb. 23, 2022, which claims priority to U.S. Provisional Application No. 63/153,646 filed on Feb. 25, 2021, and is entitled "Bent PCB Ion Guide for Reduction of Contamination and Noise", the content of which is incorporated herein by reference in its entirety.

BACKGROUND

The present disclosure relates generally to an ion guide for use in a mass spectrometer, and more particularly to such an ion guide that can ameliorate contamination of downstream components of a mass spectrometer by neutral species and/or large ion clusters.

Mass spectrometry can be employed to analyze the elemental composition of a sample by analyzing mass-to-charge ratios of the analyte components of the sample. In many mass spectrometers, ion guides are positioned upstream of one or more mass analyzers, which can focus and/or guide the ions. In many embodiments, the ions received by such ion guides can contain not only target ions of interest but also neutral species as well as large ion clusters. Such neutral species and large ion clusters can contribute to contamination, charge build-up and/or noise in components of the mass spectrometer that are positioned downstream of the ion guide.

Conventional techniques for removing neutral species and/or large ion clusters are known. Such techniques typically rely on moving the ion beam off-axis relative to the propagation path of the neutral species and ion clusters followed by returning the ion beam back onto the axis or onto a new trajectory. Such conventional techniques employ stacked ion rings or ion funnels for moving the ions off-axis. Alternatively, the conventional techniques utilize curved quadrupole ion guides.

Such conventional techniques suffer, however, from a number of shortcomings. For example, they can be expensive, and typically require complex holding and alignment jigs.

Accordingly, there is a need for methods and systems for use in mass spectrometers for removing neutral species and/or large ion clusters from an ion beam entering the spectrometer.

SUMMARY

In one aspect, an ion guide for use in a mass spectrometer is disclosed, which comprises a first plurality of conductive electrodes disposed on a first surface, a second plurality of conductive electrodes disposed on a second surface, where the two surfaces are positioned relative to one another so as to provide a passageway having an inlet for receiving an ion beam and an outlet through which ions exit the passageway, said first and second plurality of electrodes being configured for application of RF and/or DC voltages thereto for generating an electromagnetic field within the passageway. The ion guide further includes an orifice formed in at least one of those surfaces. The two surfaces are shaped such that the passageway comprises an upstream section having an inlet for receiving the ion beam and a downstream section that is offset relative to the upstream section such that one or more target ions in the ion beam travel from the upstream section to the downstream section to exit the passageway via an outlet thereof and one or more neutral species and/or large ion clusters, when present in the ion beam, exit the passageway through the orifice. A transition section extends between the upstream and the downstream sections. The transition section forms a non-zero angle relative to the upstream and downstream section (herein referred to also as a "tilt angle"). In some embodiments, such a tilt angle can be, for example, in a range of about 5 degrees to about 180 degrees.

As discussed in more detail below, an orifice is formed in the transition section and is positioned relative to the inlet of the ion guide such that neutral species and/or large ion clusters (e.g., ion clusters having m/z ratios greater than about 500), when present in an incoming ion beam, will exit the ion passageway through the orifice.

In some embodiments, the first and second surfaces are surfaces of a polymeric material, such as, Coated Polyimide, ceramic hydrocarbon (Rogers material) or standard FR4. In some such embodiments, the first and second surfaces can be the surfaces of two printed circuit boards (PCBs) positioned relative to one another to form the ion guide.

In some embodiments, the target ions that pass through the ion guide (i.e., those that are received by the ion guide's inlet and traverse the ion guide to exit through the ion guide's outlet) can have an m/z ratio, for example, in a range of about 50 to about 100,000, e.g., in a range of about 10,000 to about 60,000, or in a range of about 1000 to about 5000. Further, in some such embodiments, the large ion clusters that exit the ion guide via the orifice positioned in the transition section can have m/z ratios, for example, greater than 100,000, and may also include neutral species and other artefacts that travel in a line of sight manner through the QJet to the Q0.

In some embodiments, an annular electrode is positioned around the orifice and is configured for the application of a DC voltage thereto for facilitating the passage of large ion clusters through the orifice and/or inhibiting passage of the target ions through the orifice.

In some embodiments, at least one of the electrodes includes an electrically conductive strip. In some embodiments, the passageway has a substantially S-shaped profile.

In a related aspect, an ion guide for use in a mass spectrometer is disclosed, which comprises a first plurality of conductive strips disposed on a surface of a first printed circuit board (PCB), wherein the PCB is bent to provide at least two sections forming a non-zero angle relative to one another. The ion guide can further include a second plurality of conductive strips disposed on a surface of a second PCB, where the second PCB is also bent to provide at least two sections tilted relative to one another. The surfaces of the two bent PCBs are positioned relative to one another so as to provide a passageway having a first section comprising an inlet for receiving ions (as well as neutral species and/or large ion clusters when present in an incoming ion beam), said first section extending to a second section that is offset relative to said first section, wherein said conductive strips are configured for application of RF and/or DC voltage(s) thereto for generating an electromagnetic field within said ion passageway.

An orifice is formed within at least one of the surfaces of the first and second PCBs, where the first and second sections of the passageway and the orifice are arranged relative to one another such that one or more target ions received in the first section via the inlet travel under influence of the electromagnetic field to said second section and one or more neutral species and/or large ion clusters, when received via said inlet, exit the passageway through said orifice.

Each of the first and second plurality of conductive strips comprises at least three conductive strips.

In a related aspect, an ion guide for use in a mass spectrometer is disclosed, which comprises a first plurality of conductive electrodes disposed on a first surface, a second plurality of conductive electrodes disposed on a second surface, where the first and second surfaces are positioned relative to one another to form a passageway extending from an inlet for receiving an ion beam to an outlet through which ions exit the passageway, said electrodes being configured for application of RF and/or DC voltages thereto for generating an electromagnetic field within said passageway. An orifice is formed in at least one of the first and second surface. The first and second surfaces are shaped such that the passageway comprises an upstream section configured to receive an ion beam via said inlet, a downstream section having an outlet through which ions exit the passageway and an intermediate section that is offset relative to said upstream and downstream sections such that one or more target ions move under the influence of said electromagnetic field from said inlet to said outlet and one or more neutral species and/or large ion clusters, when present in said ion beam, exit the passageway through said orifice.

In some embodiments, the ion guide comprises a first transition section that connects the upstream section to the intermediate section and a second transition section that connects the intermediate section to the downstream section. Any of the first and second transition sections forms a non-zero angle with respect to any of the upstream and downstream section. The non-zero angle can be, for example, in a range of about 5 to about 180 degrees.

In many embodiments, each of the first and second surface comprises a surface of a printed circuit board (PCB). In some embodiments, the target ions have an m/z in a range of about 500 to about 100,000. The large ion clusters have an m/z greater than about 100,000, and may also include neutral species and other artefacts that travel in a line of sight manner through the QJet to the Q0.

In some such embodiments, the downstream section is substantially parallel to the upstream section.

In some embodiments, a cavity is positioned relative to the orifice to receive at least a portion of the neutral species and/or large ion clusters exiting the ion guide. In some such embodiments, the cavity is positioned below the intermediate section of the ion guide. In some embodiments, an ion processor can be placed within the cavity to provide, for example, mass analysis of the large ion clusters.

In a related aspect, a mass spectrometer is disclosed, which comprises an orifice for receiving an ion beam from an upstream ion source, at least one ion guide positioned downstream of the orifice for receiving the ion beam and focusing the ion beam. The ion guide can include a first plurality of conductive electrodes disposed on a first surface and a second plurality of conductive electrodes disposed on a second surface. The two surfaces are positioned relative to one another so as to provide a passageway having an inlet for receiving an ion beam and an outlet through which ions exit the passageway, said first and second plurality of electrodes being configured for application of RF and/or DC voltages thereto for generating an electromagnetic field within the passageway. The ion guide can further include an orifice formed in at least one of the surfaces. The two surfaces are shaped such that the passageway includes an upstream section receiving the ion beam and a downstream section that is offset relative to the upstream section such that one or more target ions in the ion beam travel from the upstream section to the downstream section to exit the passageway and one or more neutral species and/or large ion clusters, when present in the ion beam, exit the passageway through the orifice.

In some embodiments, a mass analyzer is disposed downstream of the ion guide for receiving at least a portion of the target ions. The electrically conductive electrodes can be arranged pairwise between the first and second surface so as to allow application of any of the RF and DC voltage(s) across the electrode pairs. In some such embodiments, a transition section extends from the upstream section to the downstream section. The transition section can form a non-zero angle with respect to the upstream and the downstream sections. In some such embodiments, the orifice is formed in the transition section.

In some such embodiments, each of the first and second surface comprises a surface of a printed circuit board (PCB).

In some such embodiments, the target ions have an m/z ratio in a range of about 500 to about 100,000. Further, in some such embodiments, the large ion clusters that exit the ion guide through the orifice can have an m/z ratio greater than 100,000. In some embodiments, an annular electrode can be positioned around the orifice and can be configured for application of a DC voltage thereto so as to facilitate the passage of large ion clusters through the orifice and/or inhibit passage of the target ions through said orifice.

In a related aspect, an ion guide for use in a mass spectrometer is disclosed, which comprises a first plurality of conductive electrodes disposed on a first surface, a second plurality of conductive electrodes disposed on a second surface, wherein said first and second surfaces are positioned relative to one another to form a passageway extending from an inlet for receiving an ion beam to an outlet through which ions exit the passageway, said electrodes being configured for application of RF and/or DC voltages thereto for generating an electromagnetic field within said passageway, an orifice formed in at least one of said first and second surface, wherein said first and second surfaces are shaped such that said passageway comprises an upstream section configured to receive an ion beam via said inlet, a downstream section having an outlet through which ions exit the passageway and an intermediate section that is offset relative to said upstream and downstream sections such that one or more target ions move under influence of said electromagnetic field from said inlet to said outlet and one or more neutral species and/or large ion clusters, when present in said ion beam, exit the passageway through said orifice.

Further understanding of various aspects of the present teachings can be obtained by reference to the following detailed description in conjunction with the associated drawings,

DETAILED DESCRIPTION

The present disclosure is generally directed to an ion guide that can be incorporated in a variety of different mass spectrometers. As discussed in more detail below, in some embodiments, such an ion guide can be formed of two bent printed circuit boards (PCBs) that are positioned relative to one another to form a passageway through which one or more target ions in an ion beam received via an inlet of the passageway can travel to reach its outlet. An orifice formed in one of the boards can allow at least some (and preferably all) of neutral species and/or large ion clusters, when present in the incoming ion beam, to exit the passageway. Although in the following embodiments, PCBs are employed for forming the ion guide, an ion guide according to the present teachings can also be formed using a variety of materials, such as a variety of polymeric materials, such as Coated Polyimide, ceramic hydrocarbon (Rogers material) or standard FR4.

Various terms are used herein in accordance with their ordinary meanings in the art. The term "printed circuit board," and its abbreviation "PCB" are used herein to refer to an element/component that contains conductive tracks, pads and other features etched from, printed on, or deposited on one or more sheet layers of material laminated onto and/or between sheet layers of a non-conductive substrate.

Figure 1A:
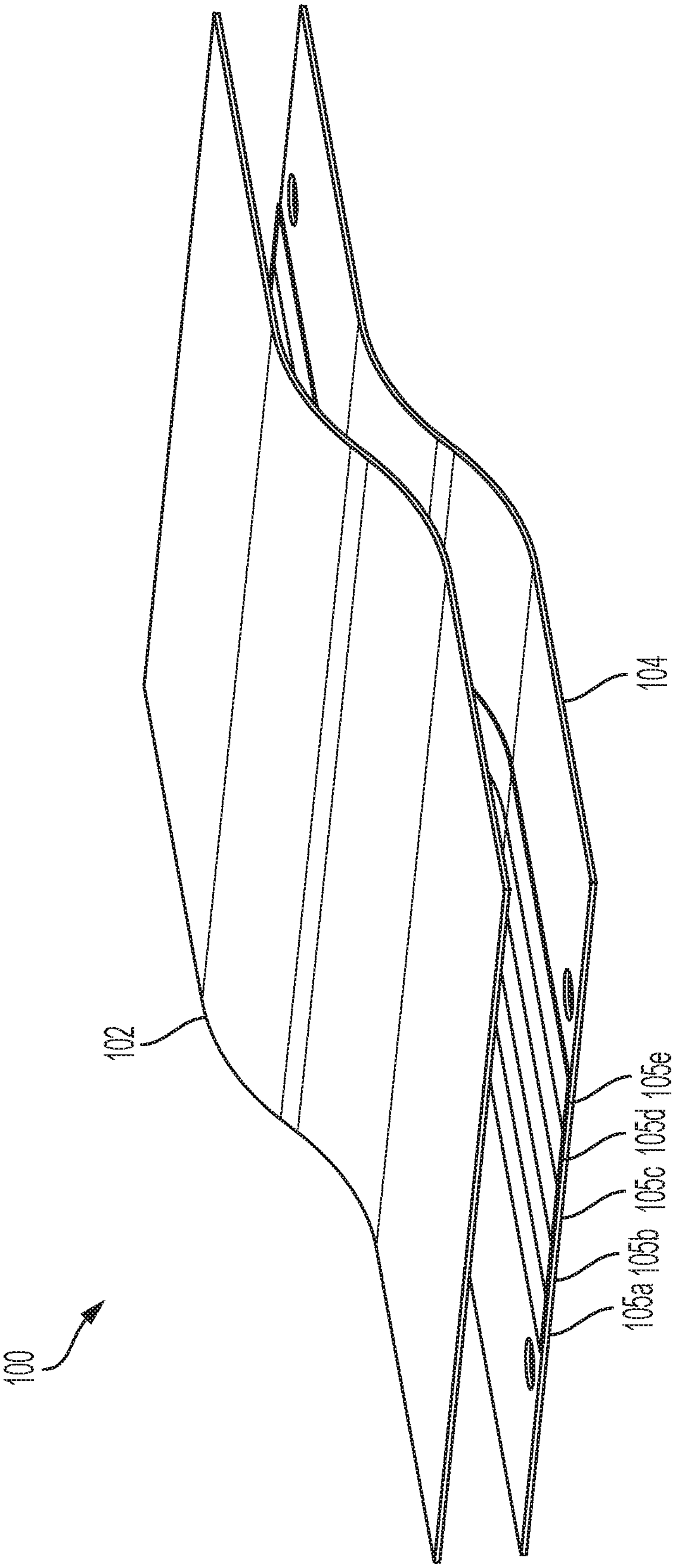
FIG. 1A is a schematic perspective view of an ion guide according to an embodiment of the present teachings.
Figure 1B:
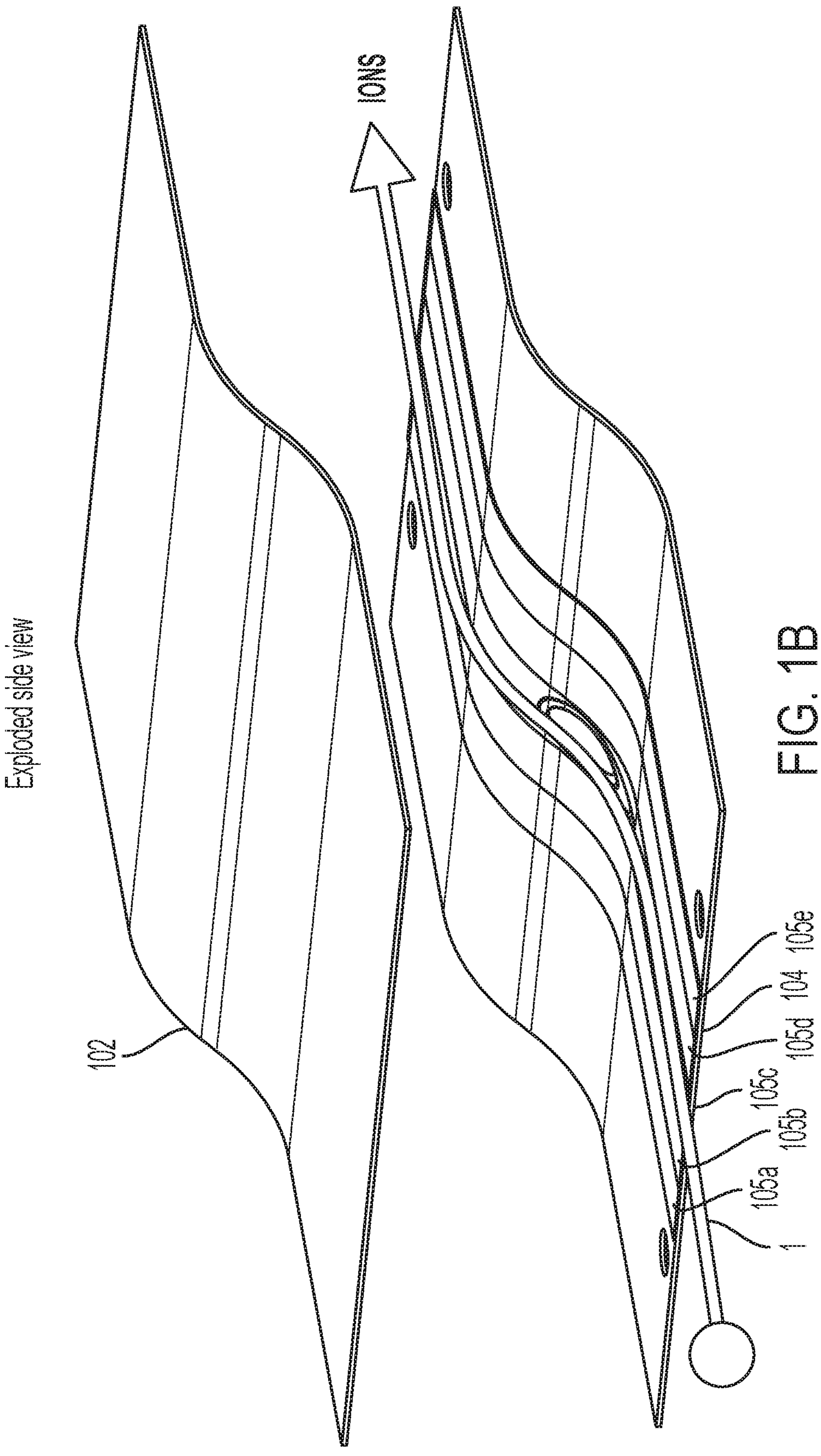
FIG. 1B is a schematic exploded view of the ion guide depicted in FIG. 1A, illustrating the transfer of target ions from its inlet to its outlet.
Figure 1C:
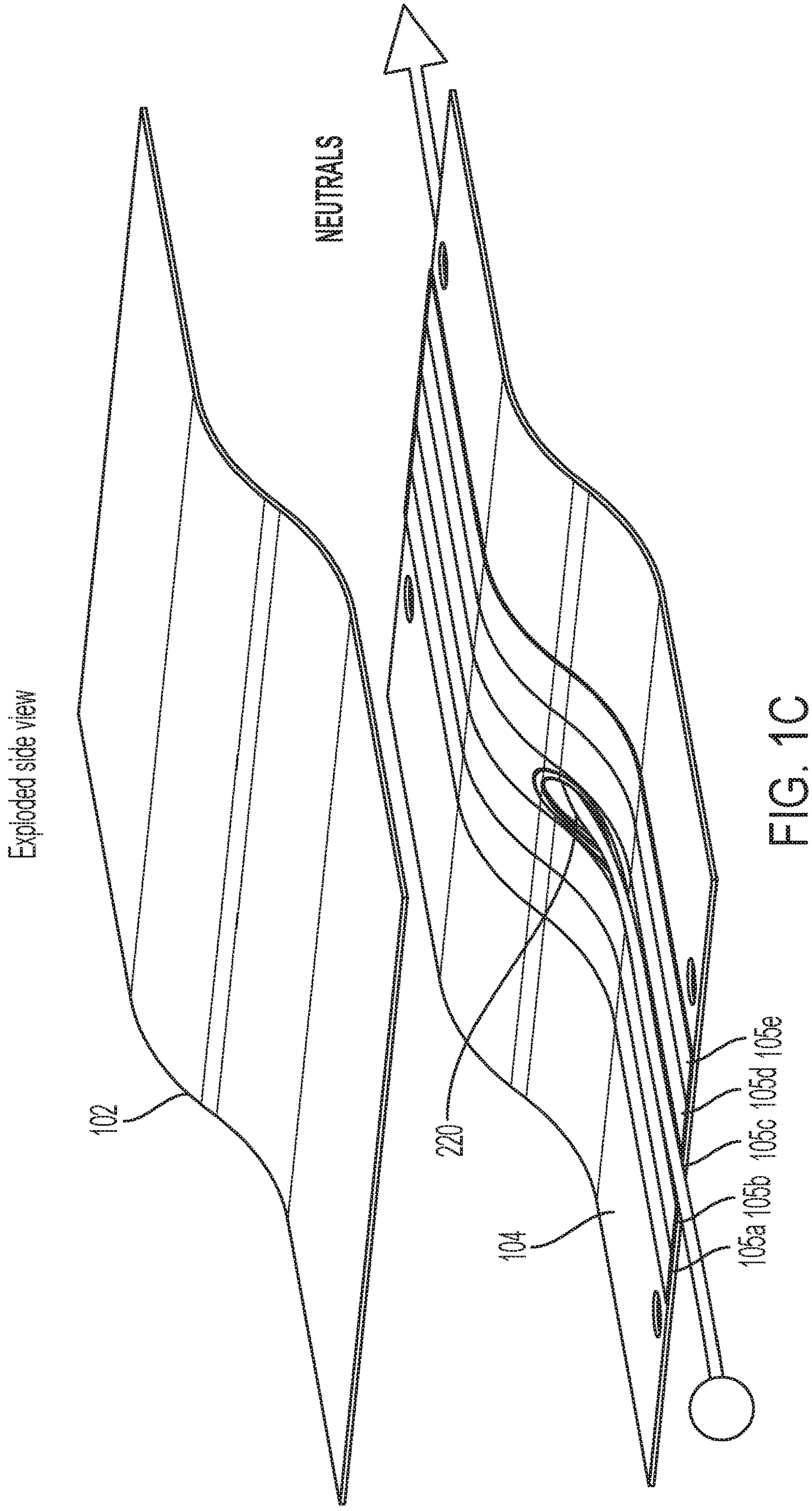
FIG. 1C is another schematic exploded view of the ion guide shown in FIG. 1A, illustrating passage of neutral species and/or large ion clusters, when present in an incoming ion beam, through an orifice provided in a lower surface of the ion guide.
Figure 1D:
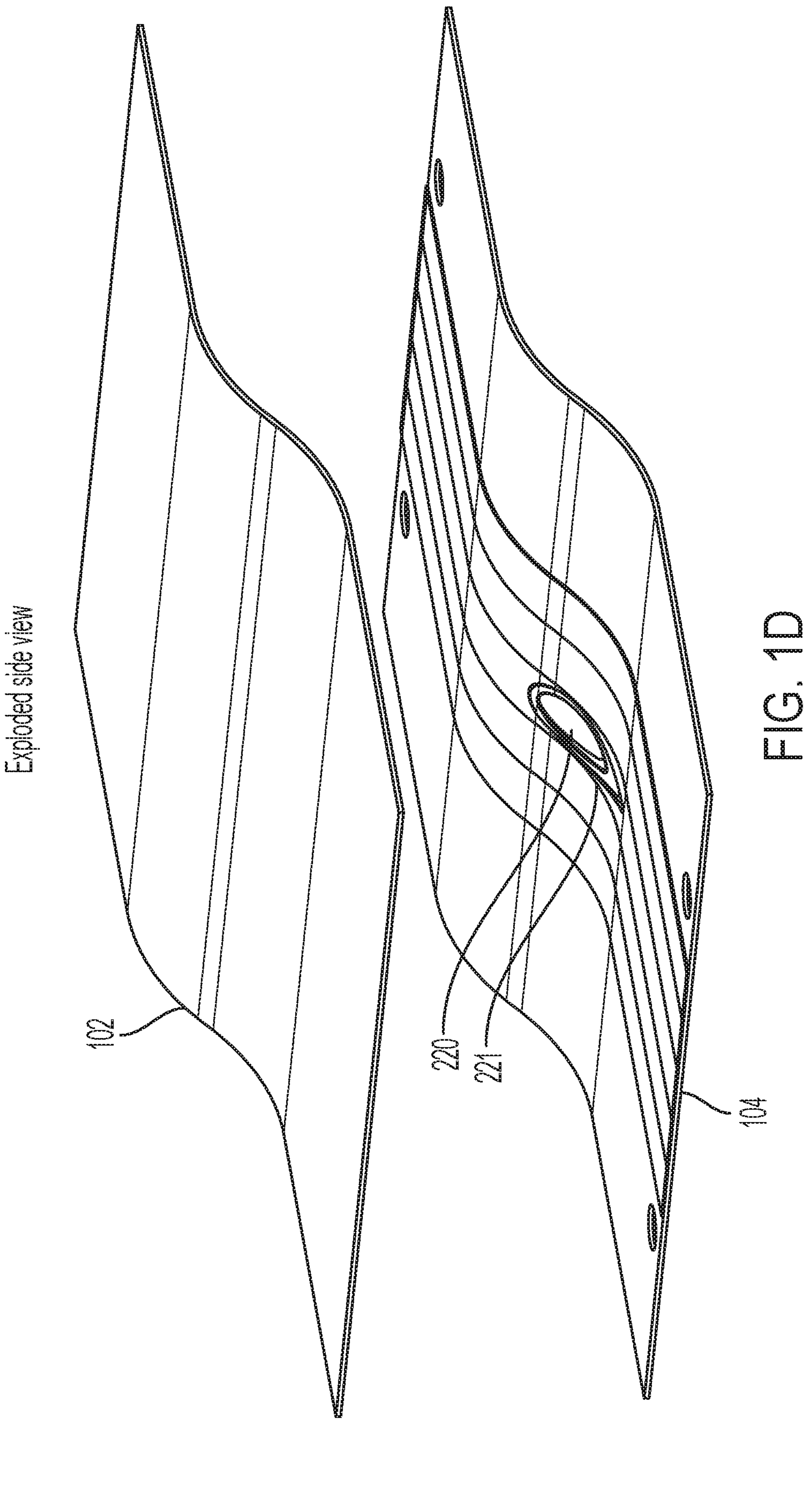
FIG. 1D is another schematic exploded view of the ion guide depicted in FIG. 1A, which illustrates a plurality of conductive electrodes deposited on a lower surface of the ion guide.
Figure 1E:
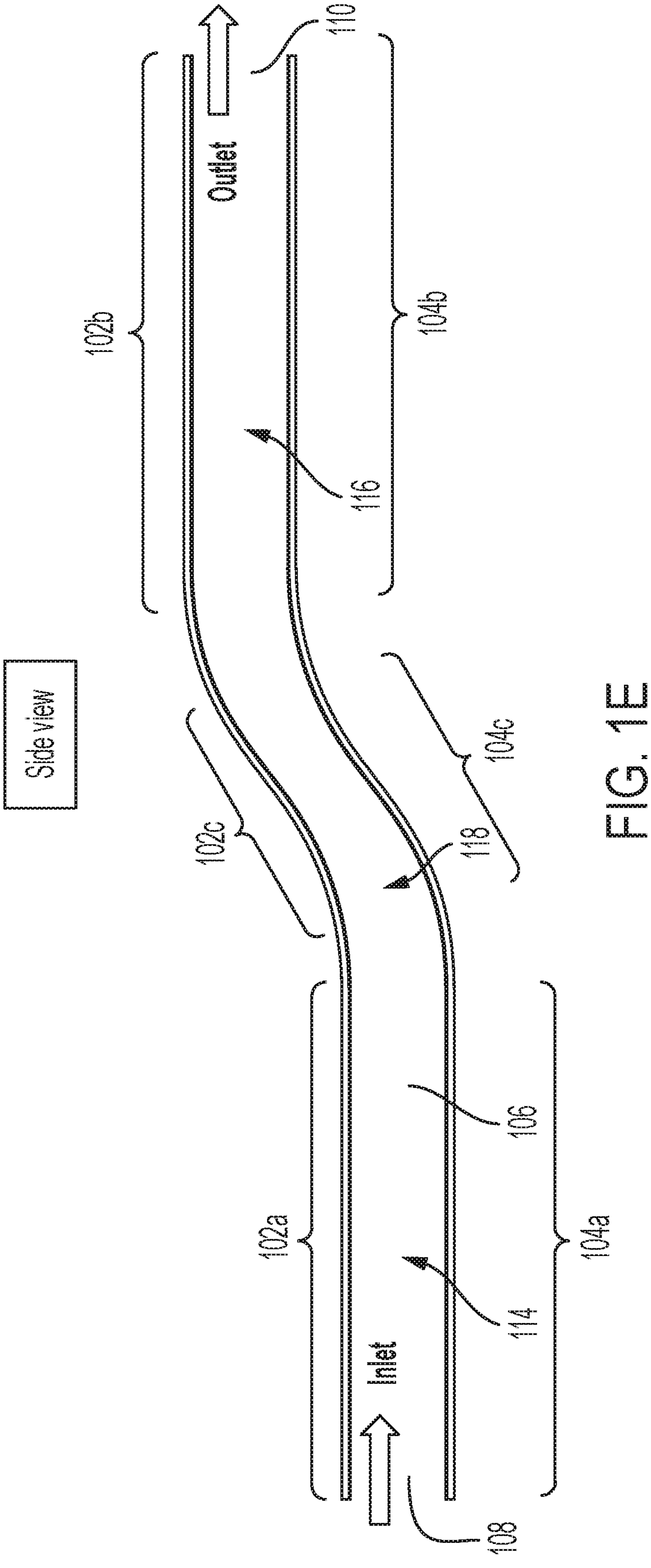
FIG. 1E is a schematic side view of the ion guide depicted in FIG. 1A, illustrating a passageway through which target ions can travel from the ion guide's inlet to its outlet.
Figure 1F:
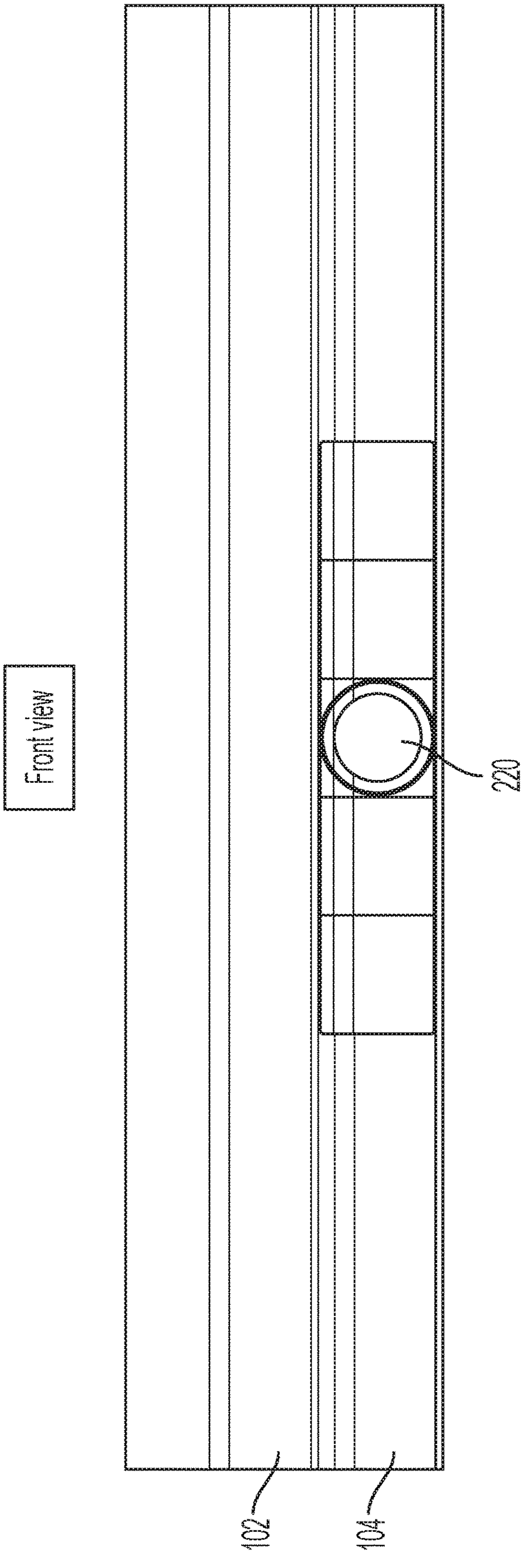
FIG. 1F is a schematic front view of the ion guide depicted in FIG. 1A.
Figure 1G:
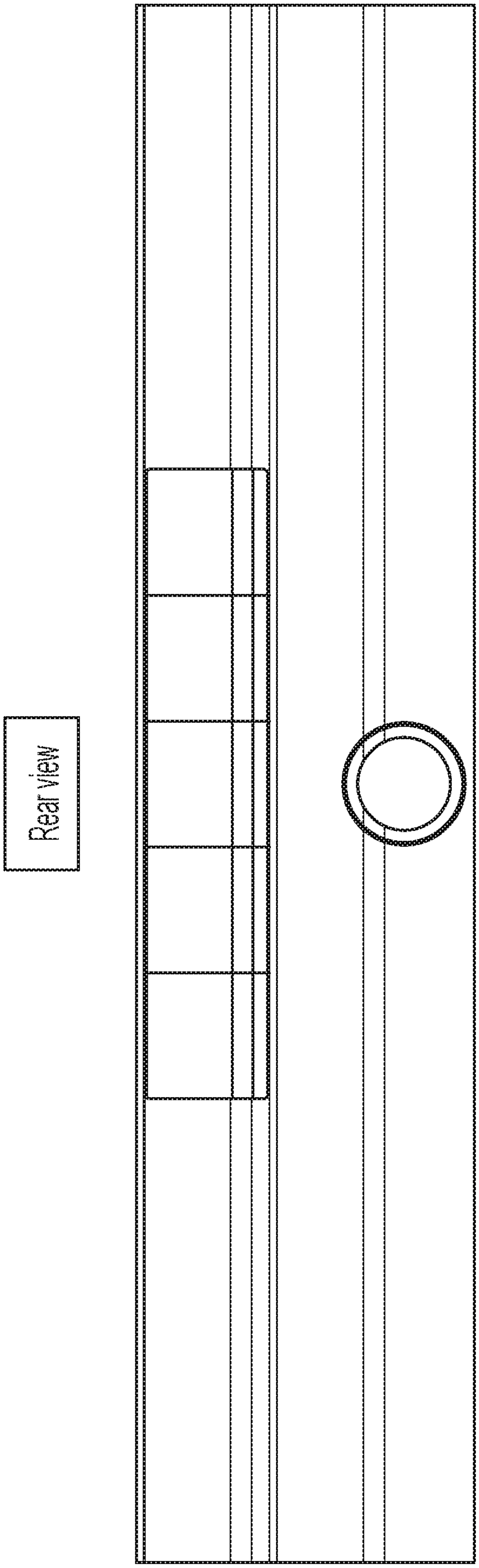
FIG. 1G is a schematic rear view of the ion guide depicted in FIG. 1A.
Figure 2A:
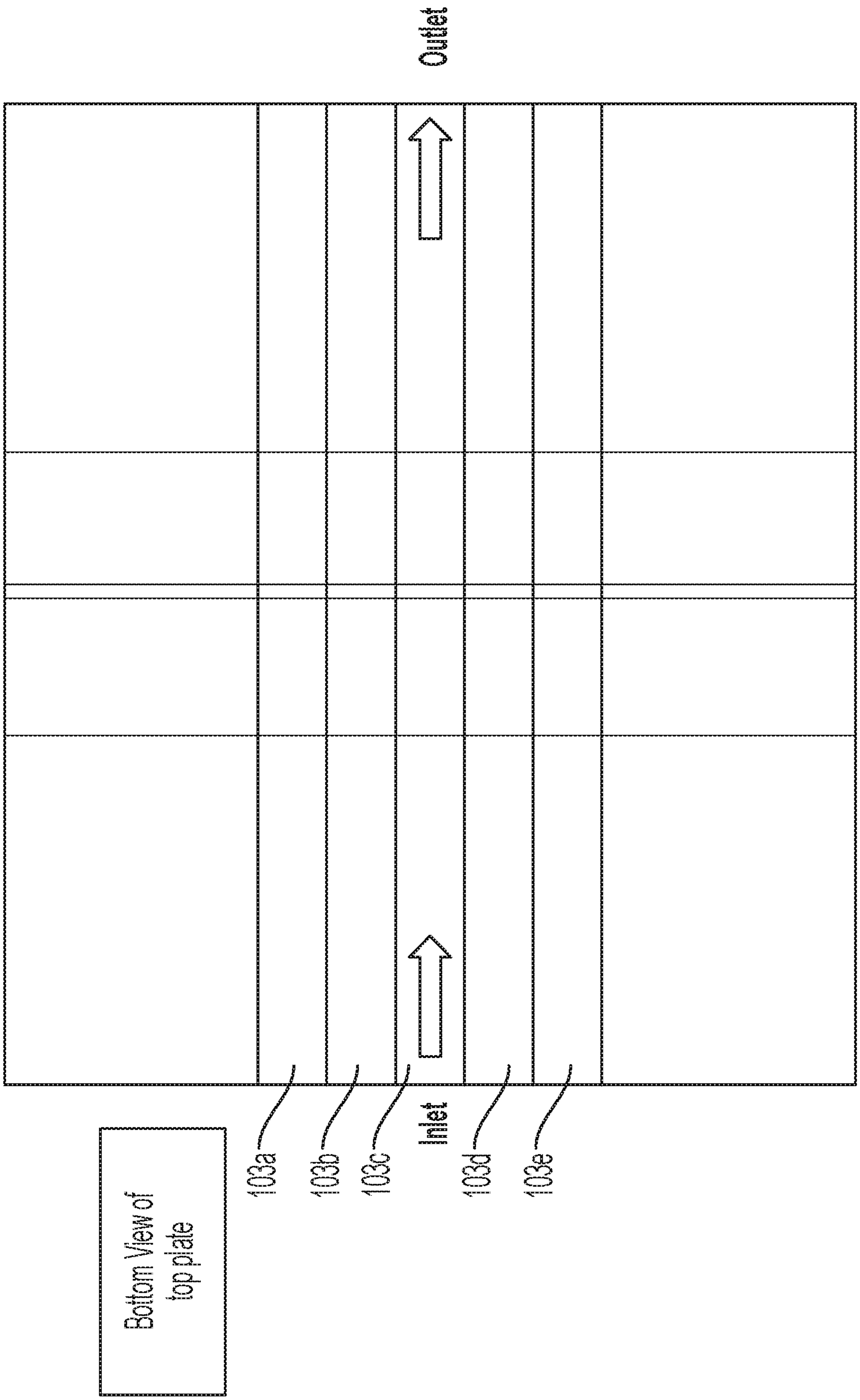
FIG. 2A is a schematic bottom view of a top plate of the ion guide shown in FIG. 1A.
Figure 2B:
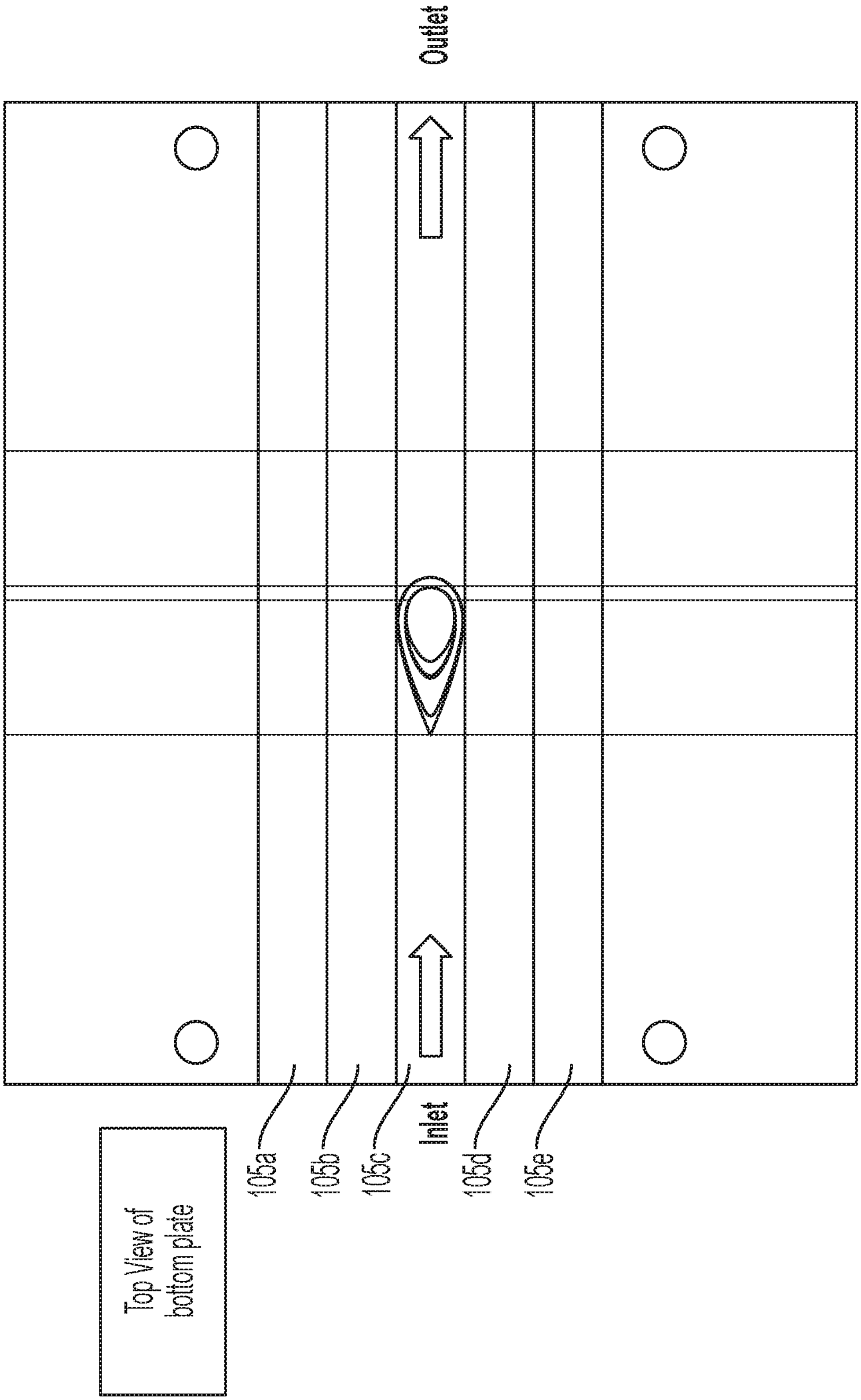
FIG. 2B is a schematic top view of a bottom plate of the ion guide shown in FIG. 1A.
Figure 2C:
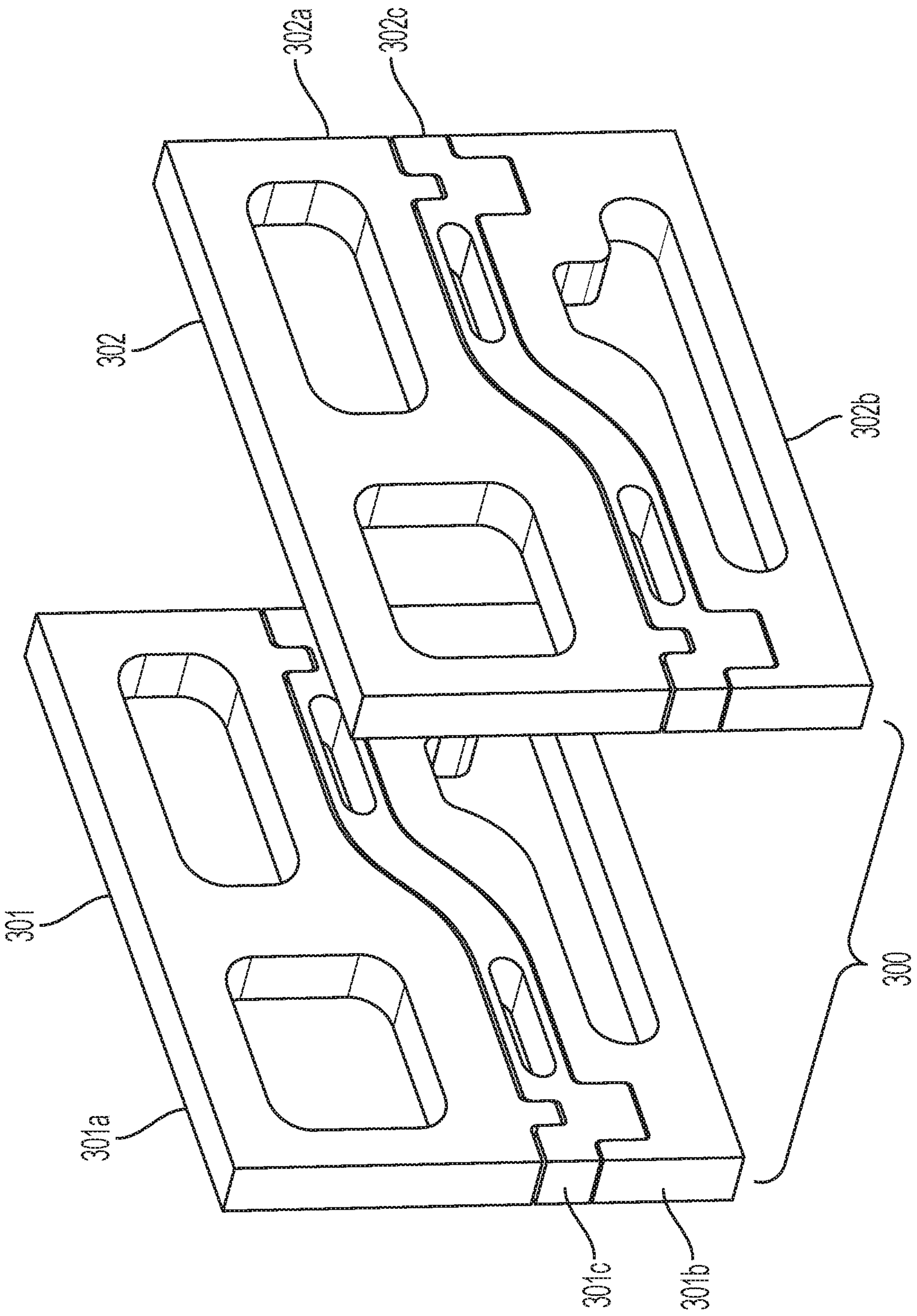
FIG. 2C is a schematic perspective view of a bracket according to an embodiment of the present teachings for holding two PCBs relative to one another, FIG. 2D schematically shows various components of each side of the bracket depicted in FIG. 2C.
Figure 2D:
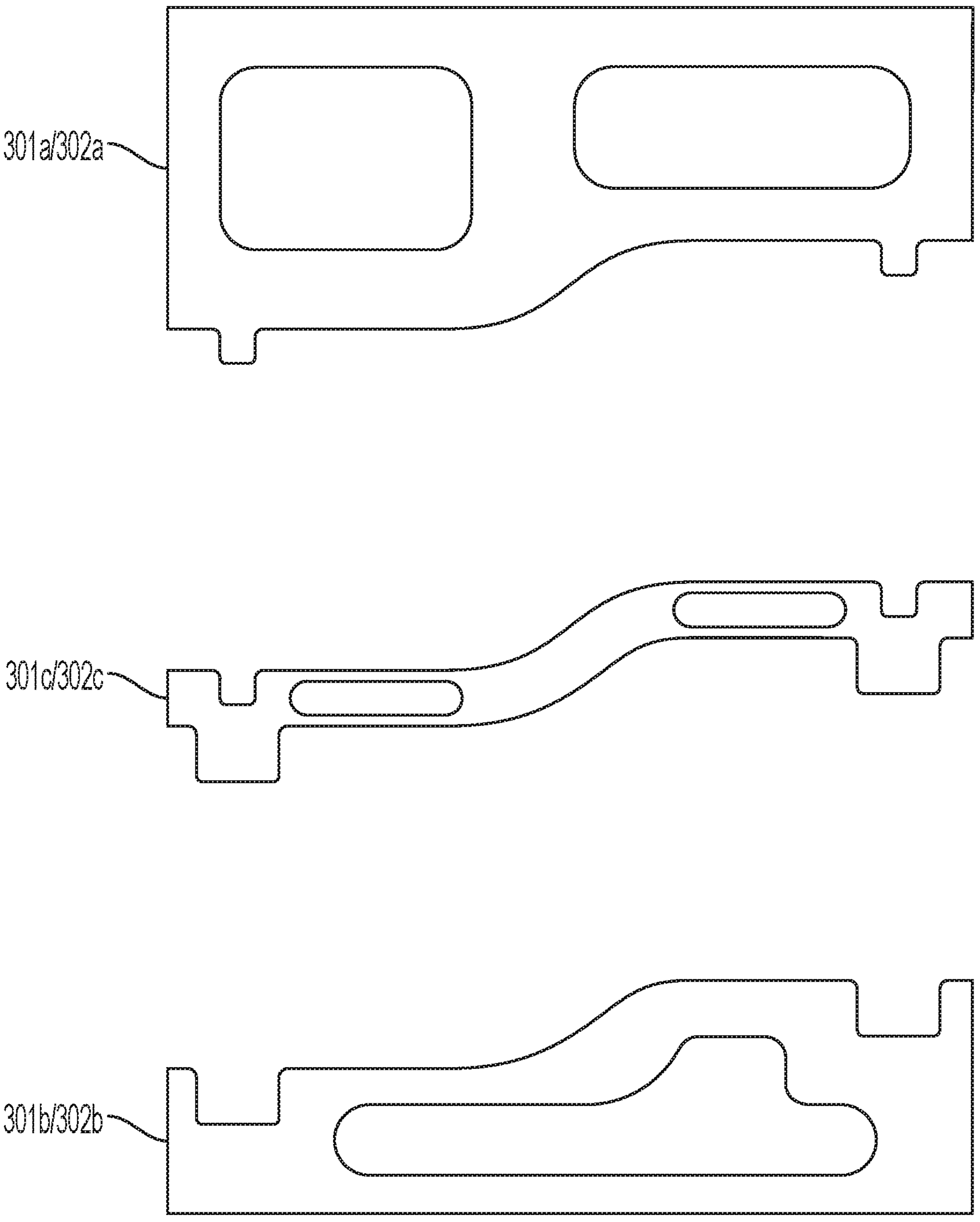
FIG. 2E is a schematic exploded view of the bracket depicted in FIG. 2C.
FIG. 2F shows two PCBs shaped and maintained in position via their coupling to the bracket shown in FIG. 2C to form an ion guide according to an embodiment of the present teachings.
FIG. 2G is an end view of the ion guide depicted in FIG. 2F, FIGS. 3A and 3B show examples of RF signals that can be applied to the conductive electrodes of the ion guide depicted in FIG. 1A, FIG. 3C schematically shows a plurality of conductive traces that can be deposited on surfaces of the PCBs for transmitting RF and/or DC voltages to the electrodes disposed on the PCBs, FIGS. 3D and 3E schematically depict conductive traces disposed on the top and bottom PCBs, respectively, each of which terminates at a metal-filled via that allows application of RF and/or DC voltages to the traces, FIGS. 3F and 3G schematically depict application of RF and DC voltages to conductive traces disposed on the top and bottom PCBs in accordance with an embodiment of the present teachings, FIG. 4A schematically depicts a perspective view of a composite ion guide formed by two ion guides placed in tandem according to an embodiment of the present teachings.
Figure 2E:
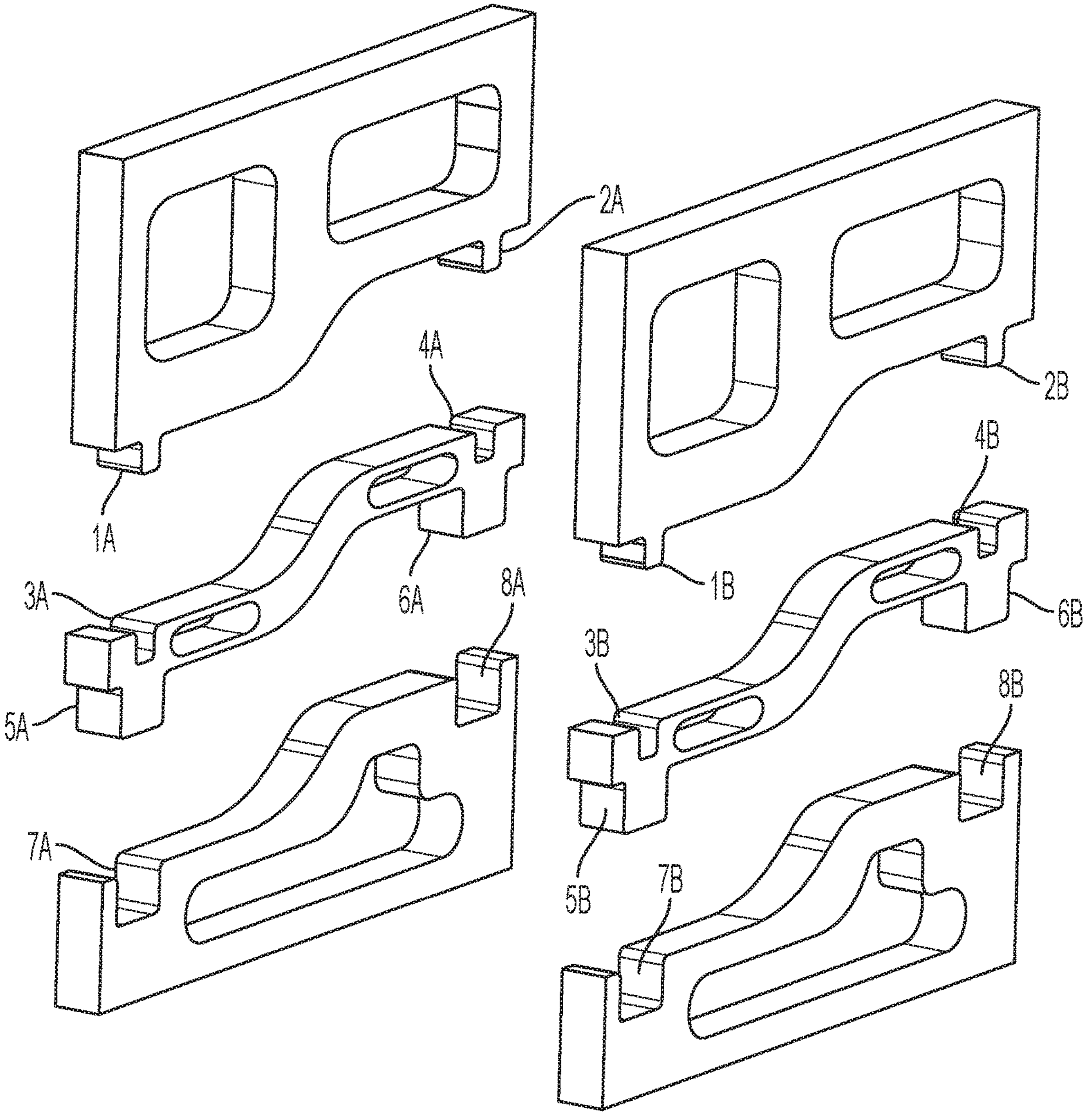

With reference to FIGS. 1A, 1B, 1C, 1D, 1E, and 1F, 2A, and 2B, an ion guide 100 according to an embodiment of the present teachings includes a first printed circuit board (PCB) 102 (herein also referred to as a top PCB as in this embodiment the two PCBs are vertically positioned relative to one another, though in other embodiments the two PCBs can be laterally positioned relative to one another), on a bottom surface of which a plurality of conductive electrodes 103*a*, 103*b*, 103*c*, 103*d*, and 103*e* (herein collectively referred to as conductive electrodes 103, See, e.g., FIG. 2A) are disposed, and a second PCB 104 (herein also referred to as the bottom PCB) on a top surface of which a plurality of conductive electrodes 105*a*, 105*b*, 105*c*, 105*d*, and 105*e* (herein collectively referred to as conductive electrodes 105) are disposed.

The top and the bottom PCBs 102/104 are positioned relative to one another so as to provide an ion passageway 106 having an inlet 108 (See, e.g., FIG. 1E) through which an ion beam generated by an upstream ion source can enter the passageway and an outlet 110 through which ions can exit the passageway.

In this embodiment, the top PCB 102 is bent such that it includes two substantially flat portions 102*a* and 102*b* that are joined by a tilted surface portion 102*c*. Similarly, the bottom PCB 104 includes two substantially flat portions 104*a* and 104*b* that are joined by a tilted surface portion 104*c*.

In this embodiment, the top and the bottom PCBs 102*a* and 102*b* are held in place and maintained relative to one another by a plurality of armatures such that the flat portion of each surface is in substantial register with a respective flat portion of the other surface and similarly, the tilted portions of the two surfaces are in substantial register.

Figure 2F:
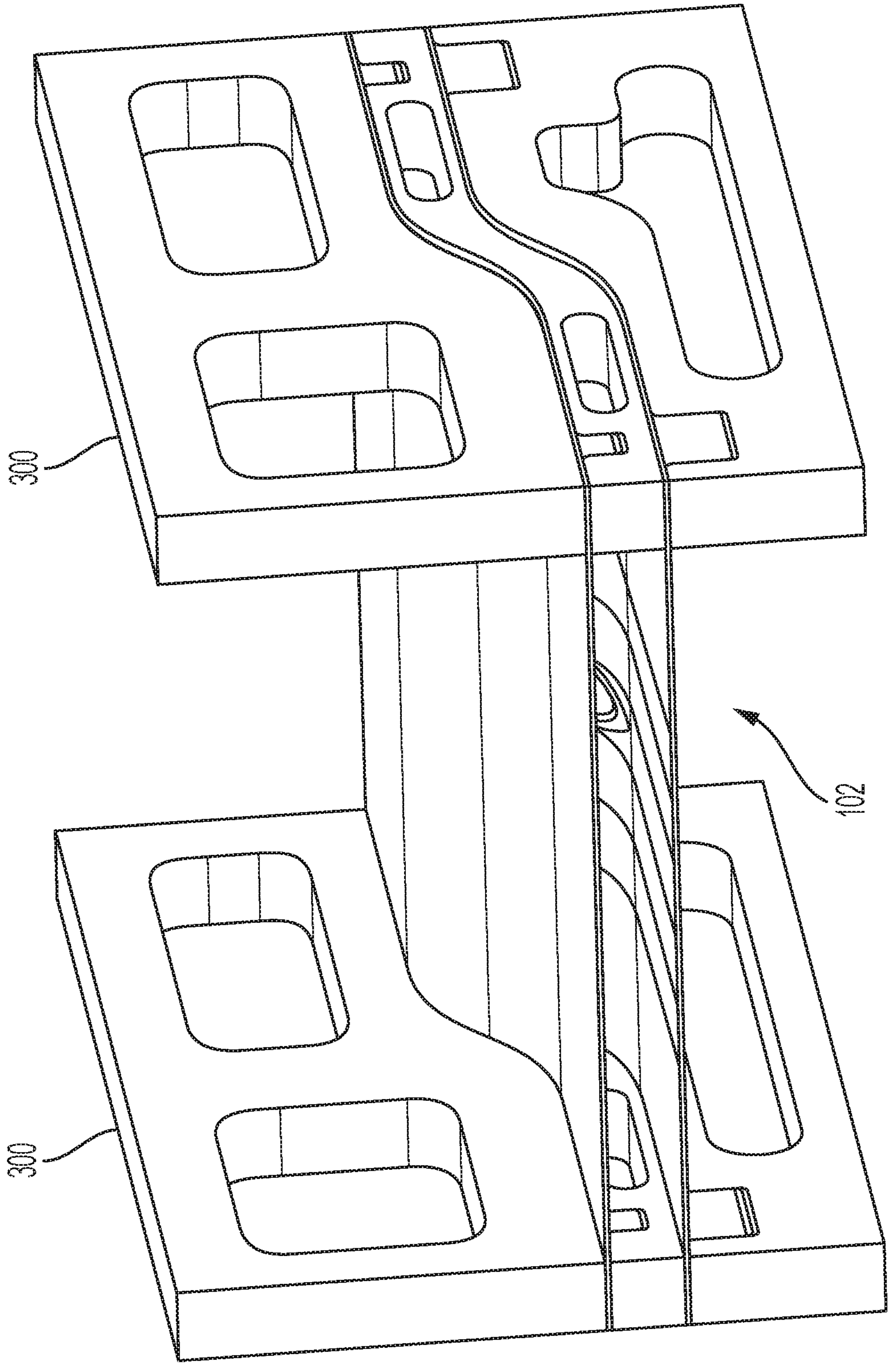
Figure 2G:
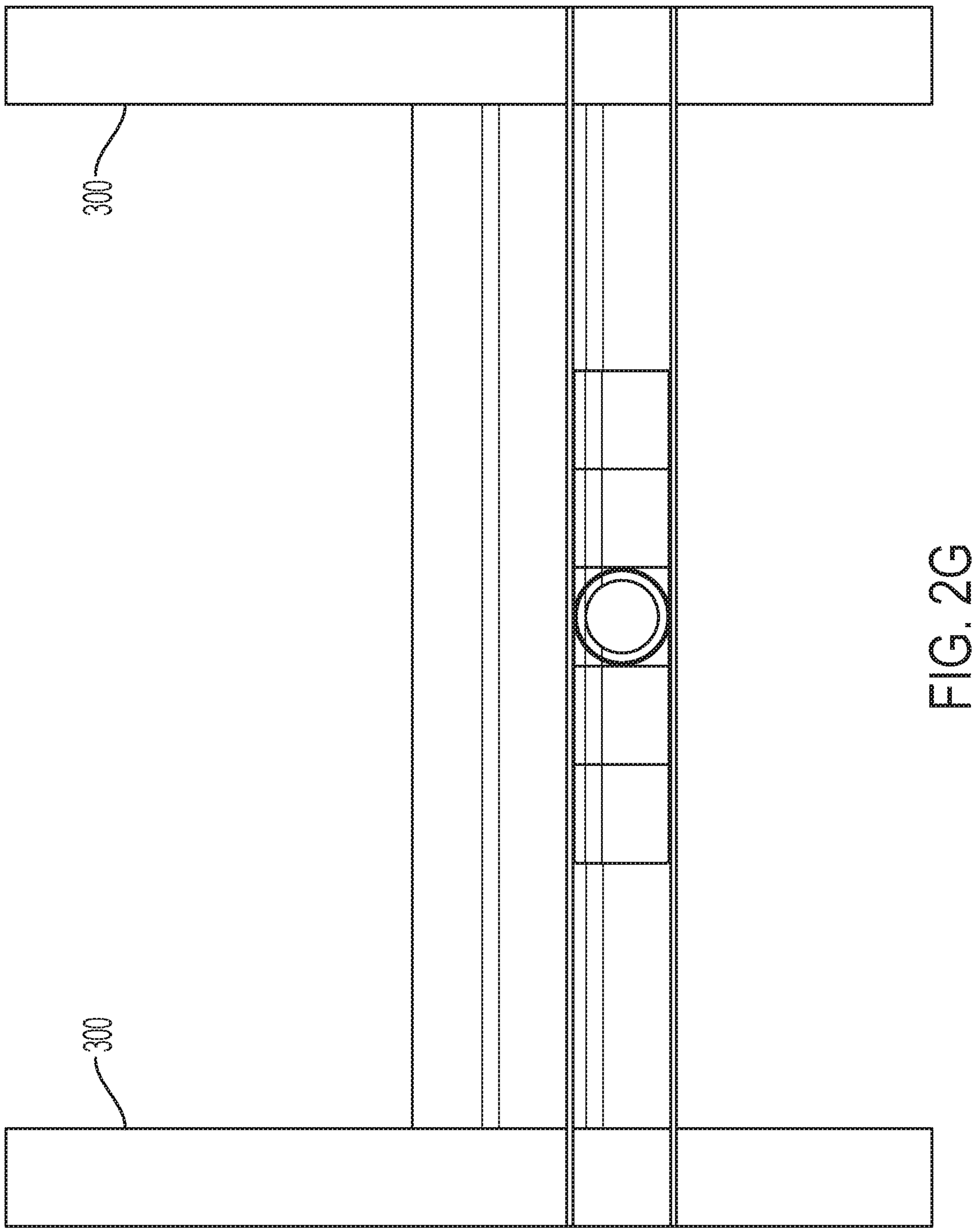

More specifically, as shown schematically in FIGS. 2C-2G, in this embodiment, the top and the bottom PCBs 102*a* and 102*b* are held in place and maintained relative to one another between two sides 301 and 302 of a bracket 300. The opposed sides 301/302 of the bracket include top portions 301*a*/302*a*, bottom portions 301*b*/302*b* and armatures 301*c*/302*c*. When one of two flat PCBs is positioned between the top portions 301*a*/302*a* of the bracket and the armatures 301*c*/302*c* and the other flat PCB is positioned between the armatures 301*c*/302*c* and the bottom portions 301*b*/302*b* of the bracket, the pressure exerted on the PCBs by the armatures and the top and bottom portions of the bracket causes the flat PCBs to take on an S-shaped profile, e.g., as shown in FIG. 2F.

In this embodiment, the top bracket portions 301*a*/302*a* include protrusions (1A,2A)/(1B, 2B) that are configured to engage with top recesses (3A/4A)/(3B/4B) of the armatures 301*c*/302*c*, and the armatures include bottom protrusions (5A, 6A)/(5B,6B), which can engage with top recesses (7A,8A)/(7B,8B) of the bottom portions 301*b*/302*b* of the PCBs 102*a*/102*b*. In this manner, the combination of the bottom surface 102 and the top surface 104 forms the ion passageway 106 that extends from the inlet 108 to the outlet 110 and includes an upstream portion 114, a downstream portion 116, and a transition portion 118, which forms a non-zero angle relative to the upstream portion 114 and the downstream portion 116 and couples the upstream portion 114 to the downstream portion 116. The tilt angle of the transition portion 118 can vary, but it is typically in a range of about 5 to about 180 degrees.

The ion guide 100 further includes an orifice 220 (See, e.g., FIG. 1D) that is formed in the slanted surface portion 104*c* of the lower PCB 104. As discussed in more detail below, neutral species and/or large ion clusters, when present in an incoming ion beam, can leave the ion guide, thus lowering the possibility of contamination of the ion guide and/or downstream components of a mass spectrometer in which the ion guide is incorporated.

In this embodiment, each of the plurality of electrodes 103 and 105 is in the form of a conductive metal strip to which DC and/or RF voltages can be applied. Each conductive strip on the top surface is in substantial register with a respective conductive strip on the bottom surface so as to form multiple pairs of conductive strips, where an RF and/or a DC voltage can be applied across each pair of conductive strips.

The application of DC and/or RF voltage(s) across one or more such pairs of conductive strips results in the generation of an electromagnetic field within the ion passageway. As discussed in more detail below, such an electromagnetic field can guide one or more target ions of interest from the inlet 108 to the outlet 110 via transit through the upstream, transition and downstream portions of the ion passageway.

One or more neutral species and/or large ion clusters (e.g., ion clusters with m/z ratios greater than about 100,000), if present in an ion beam entering the ion passageway, will propagate substantially (or completely in the case of neutral species) unaffected by the electromagnetic field within the ion passageway and hence exit the passageway through the orifice 220. The orifice 220 can have a variety of shapes, such as circular or oval. In this embodiment, the orifice 220 is substantially circular with a diameter in a range of about 5 mm to about 10 mm, though other sizes can also be employed.

Figure 3B:
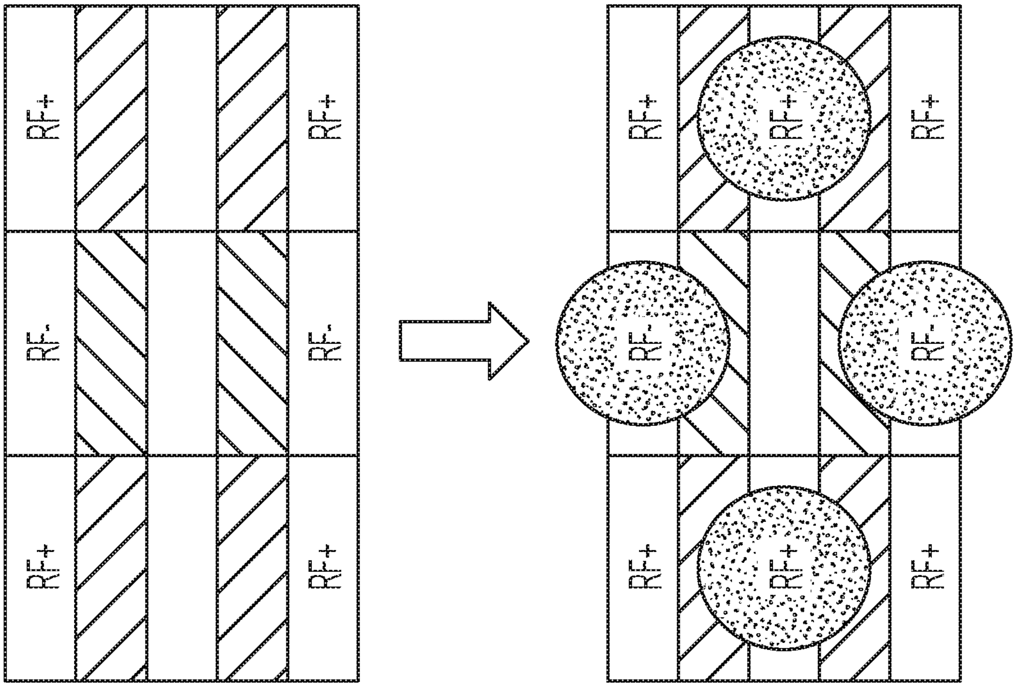
Figure 3A:
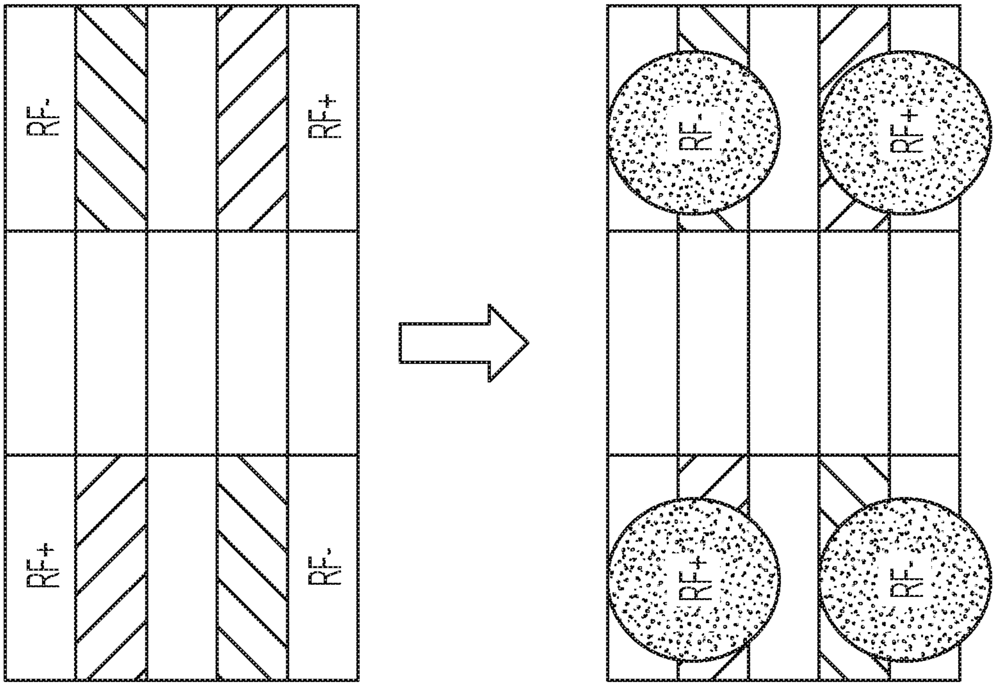

FIGS. 3A and 3B schematically depict examples of application of RF voltages across the conductive strips provided on the upper and the lower PCBs 102 and 104. In some embodiments, the applied RF voltages can have a frequency in a range of about 0.3 to about 3 MHz, and an amplitude in a range of about 20 to about 2000 volts (RF peak to ground) and the DC voltage can have an amplitude in a range of about −50 to about 50 volts. The application of voltages to the electrodes can be achieved, for example, using vias and/or traces provided on the non-electrically conductive side of the PCB boards.

Figure 3C:
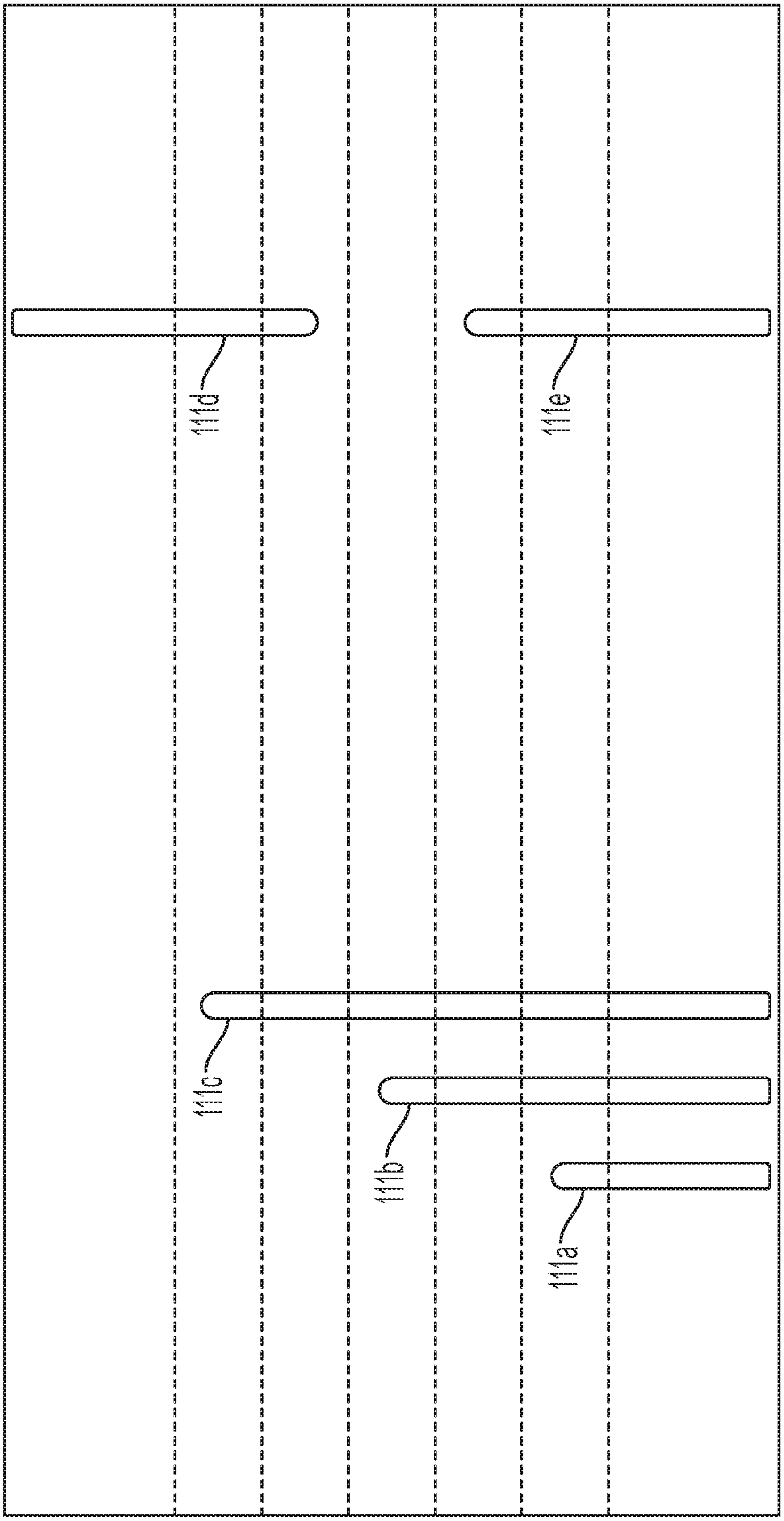

By way of example, FIG. 3C schematically shows that in this embodiment, any of the PCBs 102 and 104 can include a plurality of conductive traces 111*a*, 111*b*, 111*c*, 111*e*, and 111*d* (herein collectively referred to as traces 111) that allow the application of RF and/or DC voltages to the electrodes deposited on that PCB.

Figure 3D:
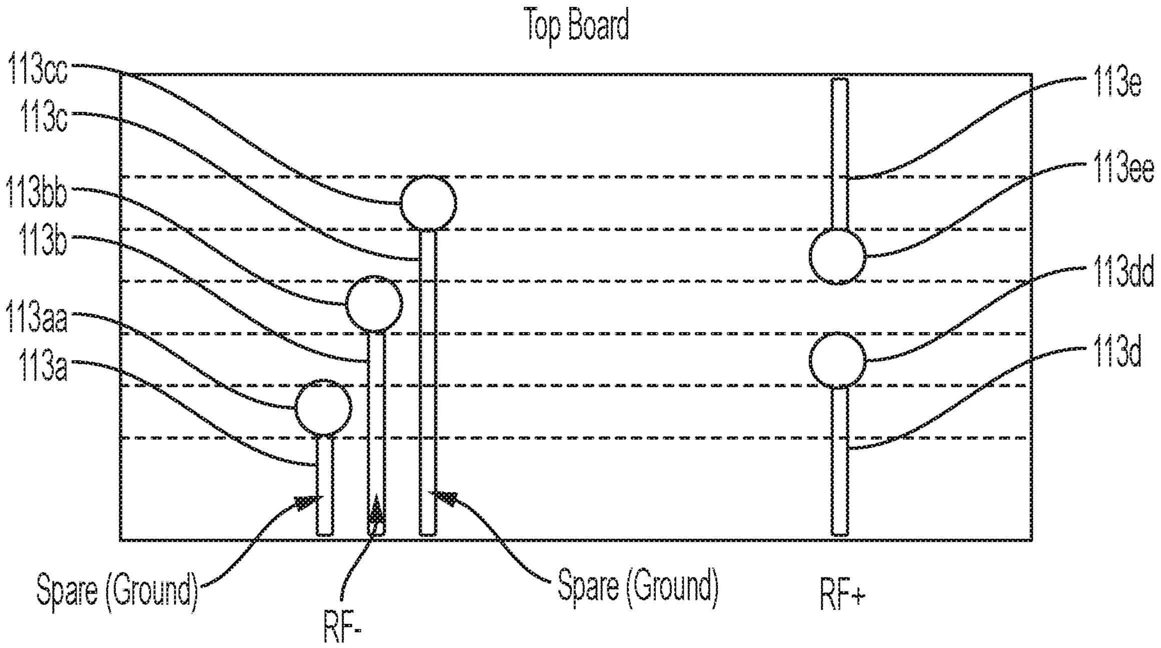

More specifically, FIG. 3D schematically depicts that the PCB 102 can include a plurality of electrically conductive traces 113*a*, 113*b*, 113*c*, 113*d*, 113*e*, and 113*f* (herein collectively referred to as conductive traces 113) on its inner surface, where each of the electrically conductive traces terminates at a metal-filled via (i.e., vias 113*aa*, 113*bb*, 113*cc*, 113*dd*, and 113*ee*), which provides electrical connection from the inner surface of the PCB to its outer surface.

Figure 3E:
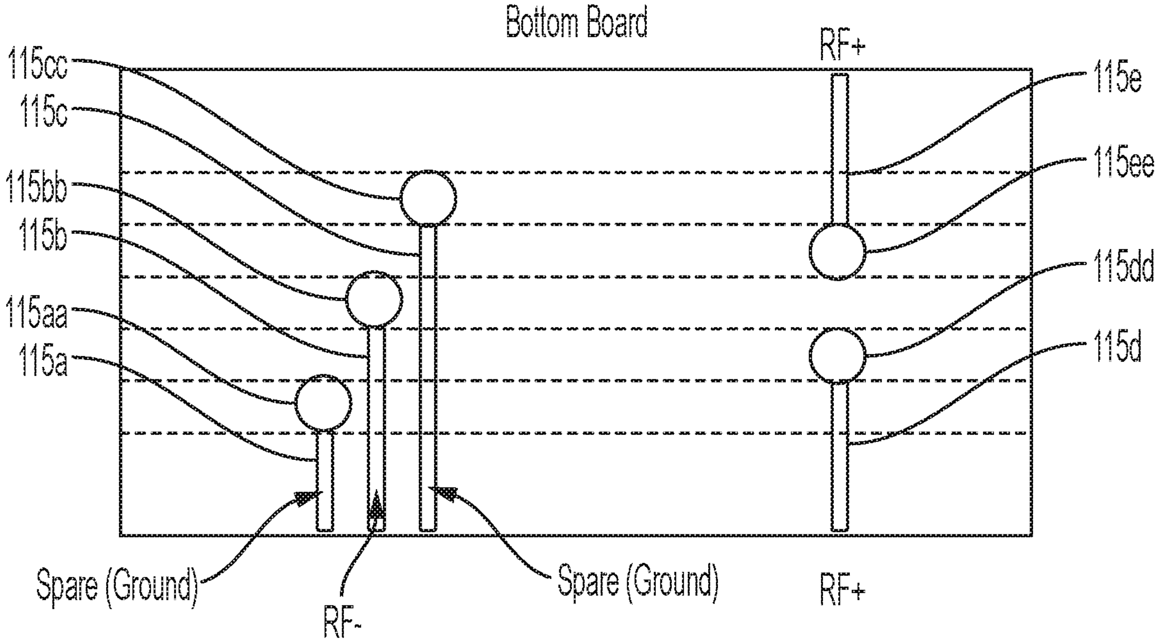

Similarly, FIG. 3E schematically depicts that the PCB 104 can include a plurality of electrically conductive traces 115*a*, 115*b*, 115*c*, 115*d*, and 115*e* (herein collectively referred to as electrically conductive traces 115) on its inner surface, where each of the electrically conductive traces 115 terminates at a metal-filled via (i.e., vias 115*aa*, 115*bb*, 115*cc*, 115*dd*, and 115*ee*), which provides electrical connection between the inner and the outer surfaces of the PCB. More specifically, the vias allow the transfer of RF and/or DC voltages from external RF and/or DC voltage sources to the electrically conductive traces, which can in turn apply those voltages to the conductive electrodes deposited on the PCBs, as shown schematically in FIG. 3F.

In the example of FIGS. 3D and 3E, the electrically conductive traces 113*a*, 115*a*, 113*c* and 115*c* are electrically grounded, and the electrically conductive traces 113*d*, 113*e*, and 115*d*, and 115*e* are coupled to RF voltages as also shown schematically in FIG. 3A.

Figure 3F:
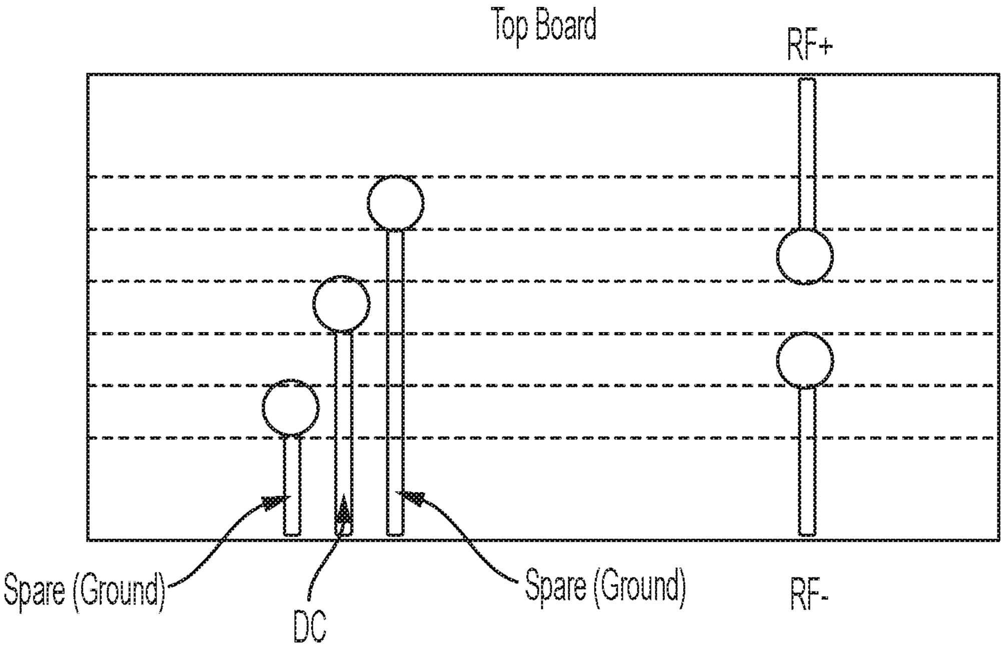
Figure 3G:
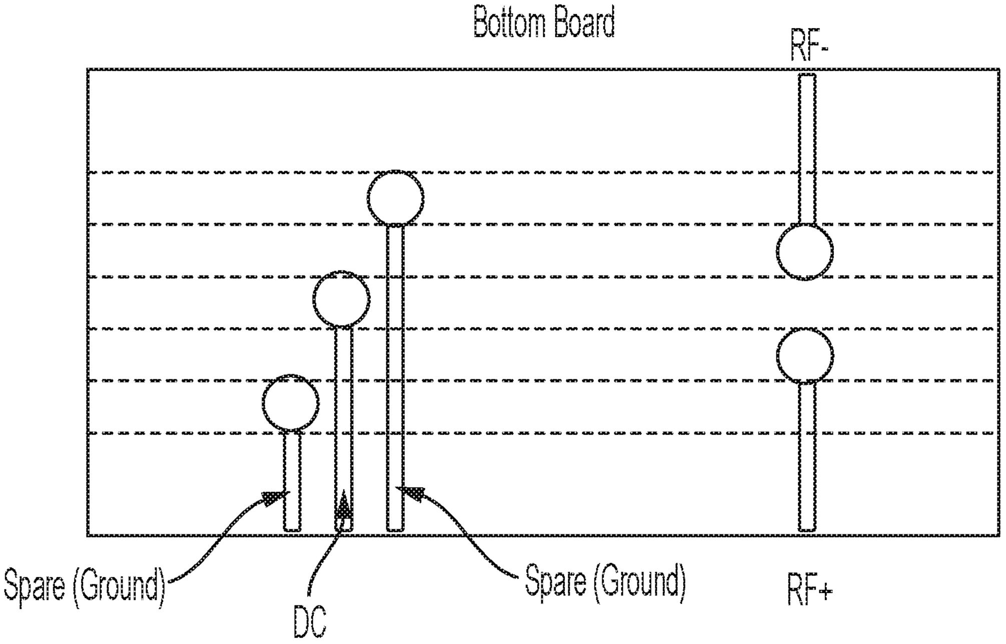

In other examples, one or more DC voltages, in addition to RF voltages, can be applied to the traces disposed on the PCBs. By way of example, FIGS. 3F and 3G show the application of DC voltages to the traces 113*b* and 115*b*, and the application of RF voltages with opposite phases to the traces of each of the trace pairs 113*e*/113*d* and 115*e*/115*d*. The resultant voltages applied to the electrodes to which the traces are connected are shown in FIG. 3B.

Referring again to FIG. 1D, in this embodiment, an annular ring electrode 221 surrounds the opening 220. The annular ring electrode 221 can be biased with a variable DC voltage to either facilitate the passage of certain ions (e.g., large ion clusters) through the orifice or hinder certain ions (e.g., target ions whose mass analysis is required) from passing through the orifice. By way of example, in some embodiments, the DC variable voltage can have an amplitude in a range of about −100 to about +100 volts.

In some embodiments, a single PCB board can be shaped to provide any of the upper or the lower surface of the ion guide. For example, a PCB board can be bent into an "S" shaped configuration to form the upper and/or the lower surfaces of the ion guide. Alternatively, multiple PCBs can be connected together to form the upper or the lower surface of the ion guide.

With reference to FIGS. 1B and 1C, upon entry of an ion beam into the ion guide 100 via its inlet port 108, those ions having m/z ratios within a desired range (or at a specific value) are guided by the electromagnetic field generated within the passageway via application of RF and/or DC voltages across the conductive strips 103 and 105 to pass through the passageway 106 to exit the ion guide via its outlet 110.

In contrast, as shown in FIG. 1C, neutral species and/or large ion clusters (e.g., ion clusters with m/z ratios greater than about 100,000) continue to travel substantially in the direction along which they entered the ion guide to exit the ion guide via the opening 220 formed in the bottom PCB 104.

Figure 4A:
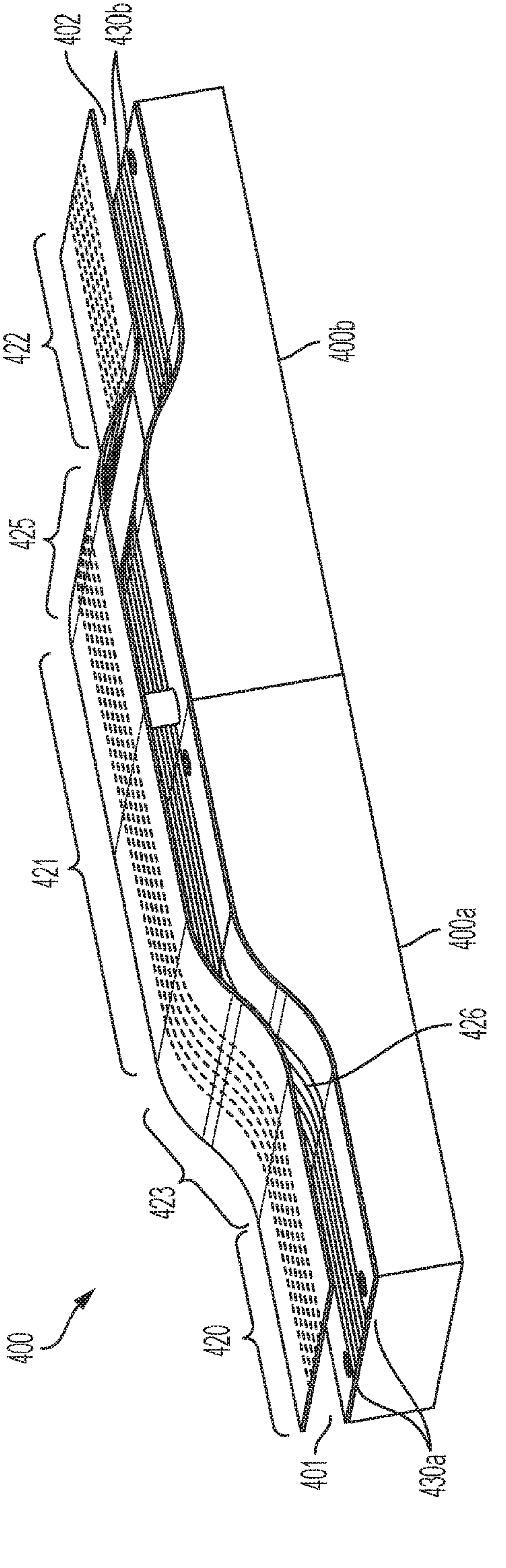
FIG. 4B is a schematic side view of the ion guide depicted in FIG. 4A, illustrating a curvilinear passageway through which target ions can travel from the ion guide's inlet to its outlet.
Figure 4B:
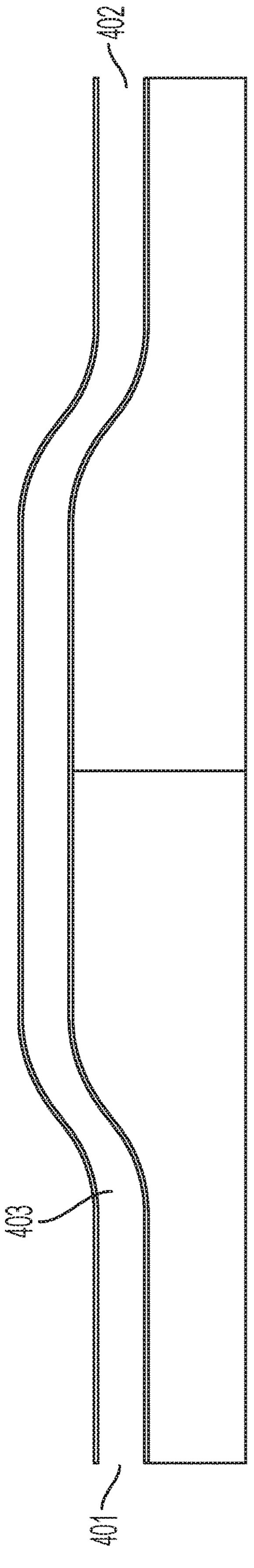

In some embodiments, two or more of the ion guides, such as the ion guide 100 discussed above, can be placed in tandem so as to form a composite ion guide. By way of example, with reference to FIGS. 4A and 4B, such a composite ion guide 400 can be formed by placing two ion guides 400*a*/400*b* back-to-back, where each of the ion guides 400*a* and 400*b* has the structure of the ion guide 100 discussed above. In some embodiments, a single flat PCB can be bent so as to acquire the desired shape.

The composite ion guide can be characterized by an upstream portion 420, an intermediate portion 421, and the downstream portion 422. A slanted transition portion 423 connects the upstream portion 420 to the intermediate portion 421 and another slanted transition portion 425 connects the intermediate portion 421 to the downstream portion 422. The ion guide 400*a* includes a plurality of electrically conductive strips 430*a* disposed on a bottom surface thereof and a respective set of electrically conductive strips (not visible in these figures) disposed on an upper surface thereof.

Similarly, the ion guide 400*b* includes a plurality of conductive strips 430*b* disposed on a bottom surface thereof and a respective set of electrically conductive strips (not visible in these figures) disposed on an upper surface thereof. Application of RF and/or DC voltages across one or more pairs of the upper and lower conductive strips generates an electromagnetic field within the passageway, e.g., in a manner discussed above in connection with the ion guide 100.

In this embodiment, an orifice 426 is formed in the lower surface of the ion guide 400*a*, in a manner discussed above in connection with the ion guide 100, through which neutral species and/or large ion clusters can exit the ion guide, as discussed in more detail below. Though not shown in this figure, similar to the above embodiment, an electrode surrounding the orifice 426 can be optionally provided, where the application of a DC voltage to such an electrode can inhibit the passage of the ions of interest out of the ion guide through the orifice while facilitating the removal of the neutral species and/or large ion clusters through the orifice. In this embodiment, the downstream ion guide 400*b* does not include such an orifice.

The combination of the upstream, the intermediate, the downstream and the transition portions of the ion guide 400 forms a curvilinear ion passageway 403 (See, e.g., FIG. 4B) that extends from an inlet 401 through which an ion beam can enter the ion guide 400 to an outlet 402 through which ions can exit the ion guide.

Figure 5A:
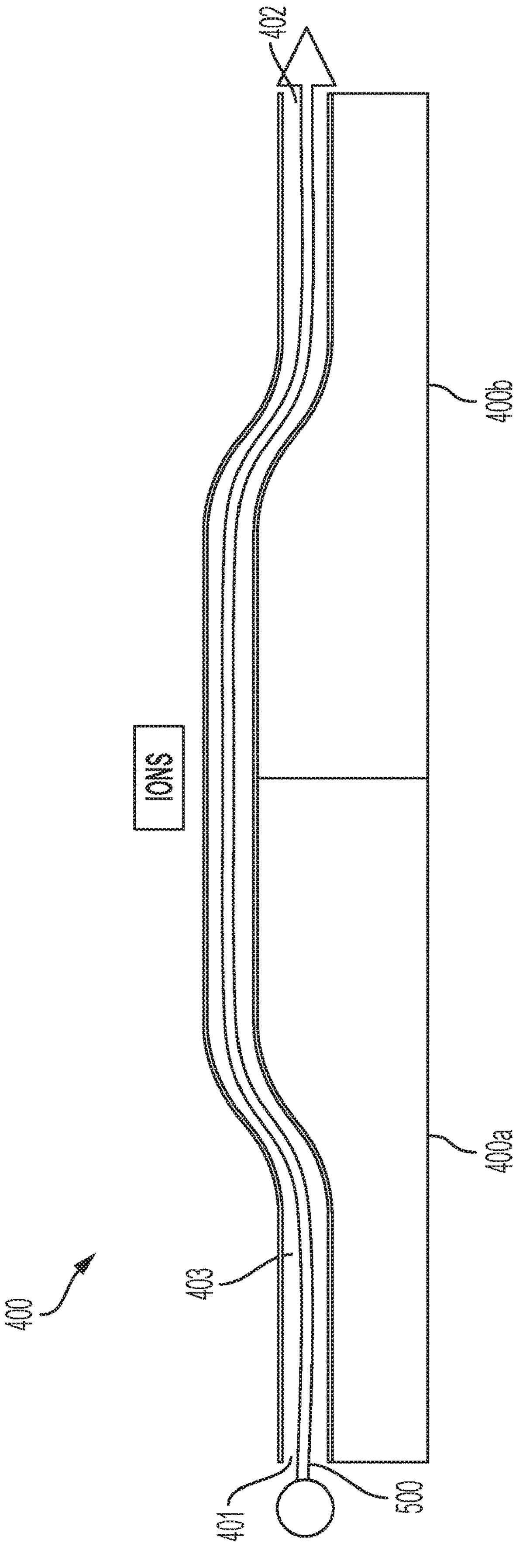
FIG. 5A is another schematic side view of the ion guide depicted in FIGS. 4A and 4B, illustrating an ion beam propagating from the ion guide's inlet to its outlet, FIG. 5B schematically depicts another perspective view of the composite ion guide of FIG. 4A, illustrating the passage of neutral species and/or large ion clusters through an orifice provided in the lower surface of the ion guide, FIG. 5C schematically depicts a cavity formed beneath the lower surface of the ion guide depicted in FIG. 5A, which receives neutral species and/or large ion clusters exiting the ion guide via the orifice provided in the ion guide's lower surface, FIG. 5D schematically depicts an ion guide according to an embodiment, which employs an electrostatic deflector for guiding at least a portion of large ion clusters exiting the ion guide into another ion guide for mass analysis, FIG. 6 schematically depicts an ion guide according to another embodiment in which at least a portion of large ion clusters exiting the ion guide are fragmented to generate a plurality of product ions, which are then received via an opening into a downstream section of the ions to be subjected to mass analysis by downstream components of a mass spectrometer in which the ion guide is incorporated, and FIG. 7 schematically depicts an example of a mass spectrometer in which an ion guide according to the present teachings can be incorporated.
Figure 5B:
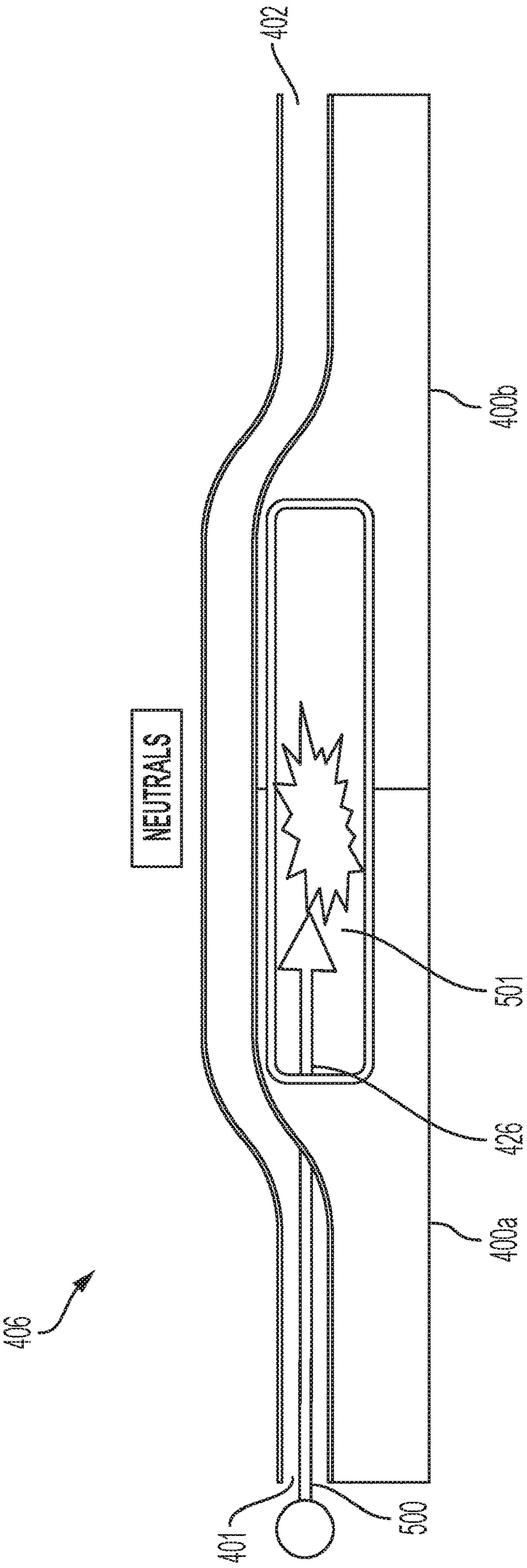

More specifically, with reference to FIGS. 5A and 5B, in use, an ion beam 500 can enter the ion guide 400*a* via the inlet 401. As noted above, the application of RF and/or DC voltages across one or more pairs of the conductive elements (e.g., conductive strips) provided on the top and the bottom surfaces of the ion guides 400*a* and 400*b* can generate an electromagnetic field within the passageway 403 that can guide target ions of interest (i.e., ions having m/z ratios within a desired range) from the inlet 401 of the passageway to its outlet 402 through which the ions can exit the passageway.

Figure 5C:
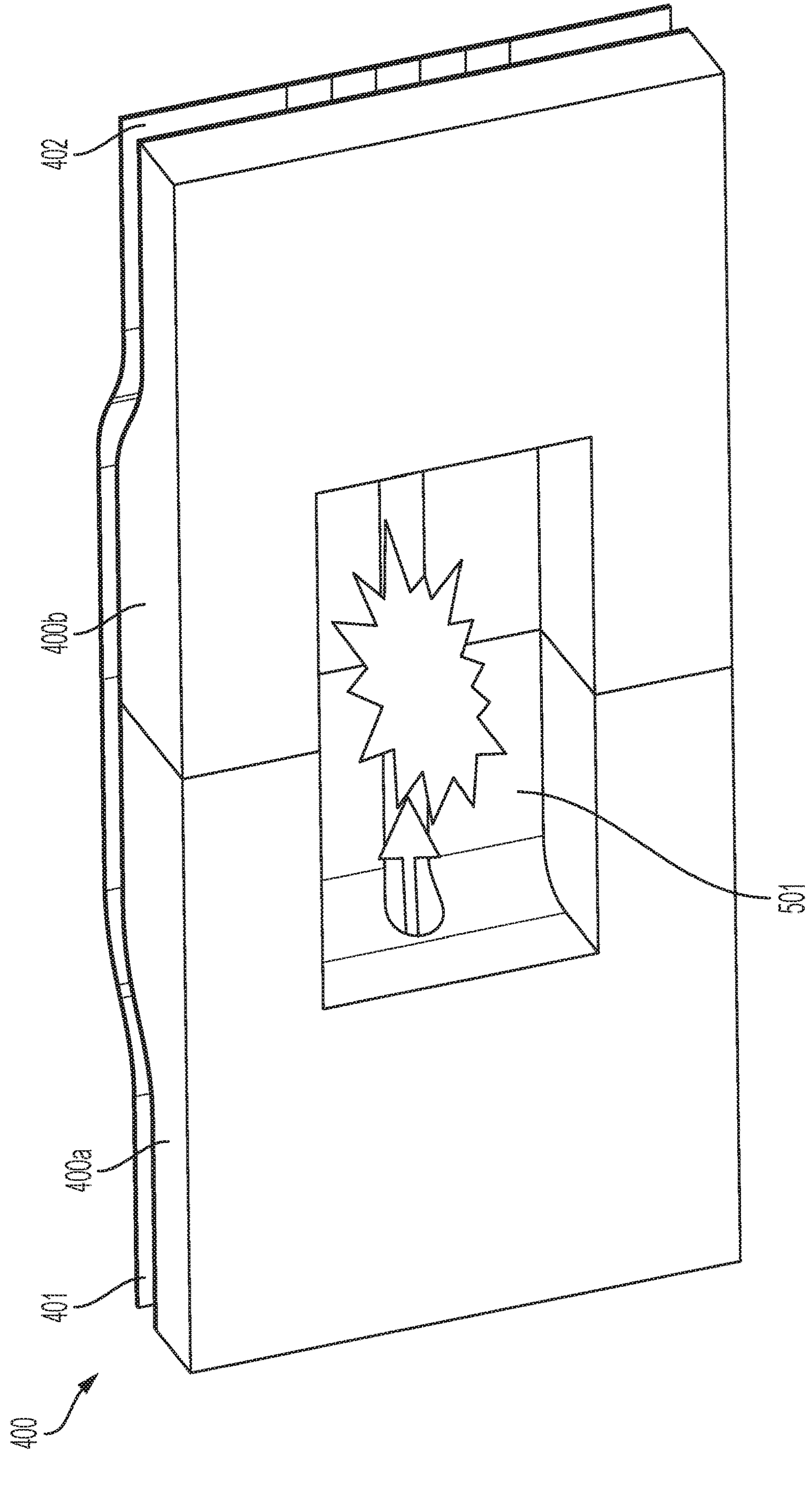

In contrast, as shown schematically in FIGS. 5B and 5C, neutral species and/or large ion clusters, when present in the ion beam, will exit the ion guide 400 via the orifice 426 to enter a cavity 501 formed by the outer surface of the two transition portions and the intermediate portion. In some embodiments, the large ion clusters can be destroyed, or ejected/bent into another device for mass analysis.

Although in the above embodiment the composite ion guide 400 is formed by placing two ion guides back-to-back, in other embodiments, the ion guide 400 can be formed as one integral unit. For example, two PCBs can be shaped to form an upper PCB providing the upper surface of the ion guide and a lower PCB providing the lower surface of the ion guide. The two PCBs can be fixedly positioned relative to one another using a plurality of posts or other mechanical means.

As discussed below, in some embodiments, an ion processor may be positioned within this cavity for mass analysis of the large ion clusters that exit the upstream ion guide 400*a*. In some embodiments, the ion processor can include a surface that is configured to facilitate surface-induced dissociation of the highly charged ions for further characterization. Alternatively, the ion processor can provide a static DC deflection voltage that would, in effect, disperse the beam based on the kinetic energies of the constituent ions. Finally, the large cluster ions can be directed to an alternative mass analyzer, such as a charge detection electrostatic ion trap for additional m/z analysis.

Figure 5D:
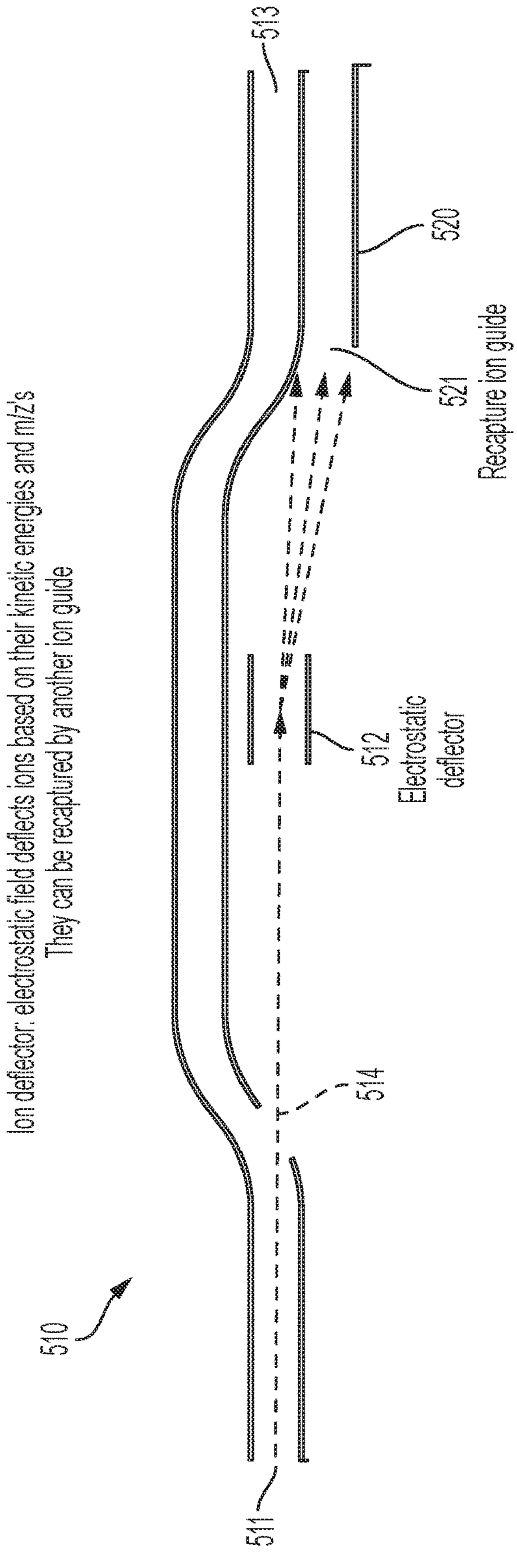

By way of illustration, FIG. 5D schematically depicts another embodiment of a composite ion guide 510 according to the present teachings having an inlet 511 through which ions can enter the ion guide. Ions of interest pass through the ion guide to exit the ion guide via an outlet 513 thereof, whereas large ion clusters and/or neutral species exit the ion guide via an opening 514 to be received by an electrostatic deflector 512 that is positioned in a cavity below the intermediate portion of the ion guide. The electrostatic deflector 512 can direct at least some of the large ions into another ion guide 520, e.g., based on their m/z ratios and kinetic energies. The ion guide 520 can in turn guide the ions to downstream components, e.g., one or more mass filters and/or mass analyzer, to be subjected to mass analysis.

Figure 6:
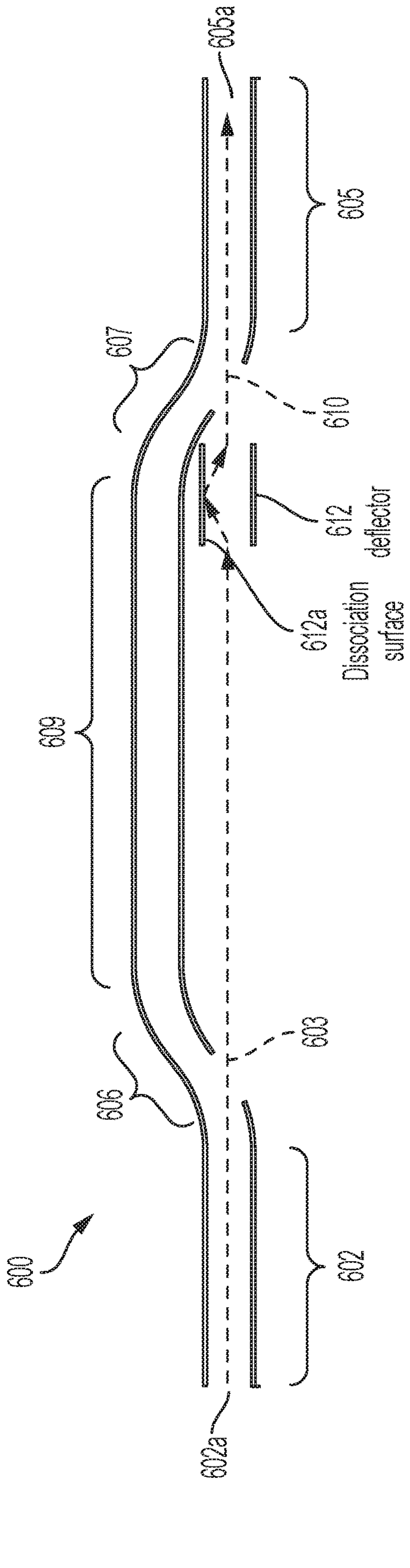

By way of further illustration, FIG. 6 schematically shows another embodiment of a composite ion guide 600 according to the present teachings, which similar to the previous embodiments, includes an upstream section 602 having an inlet 602*a* for receiving ions from an upstream ion source (not shown in this figure), a downstream section 605 through which ions that are guided through the ion guide exit the ion guide 605*a*, and two transitions sections 606/607 that connect the upstream and the downstream sections, respectively, to an intermediate section 609. Similar to the previous embodiments, an opening 603 provided in the wall of the transition section 606 allows large ion clusters and/or neutral species to exit the ion guide to enter a cavity below the intermediate section of the ion guide.

An ion deflector 612 disposed in the cavity below the intermediate section receives at least some of the large ion clusters. The ion deflector 612 includes at least one surface 612*a* that can facilitate the dissociation of at least some of the large ion clusters incident thereon so as to generate a plurality of product ions. At least some of the product ions are received by an opening 610 provided in the wall of the transition section 607 of the ion guide to enter the downstream section 605 through which the product ions reach the downstream components of a mass spectrometer in which the ion guide 600 is incorporated to be subjected to mass analysis.

Figure 7:
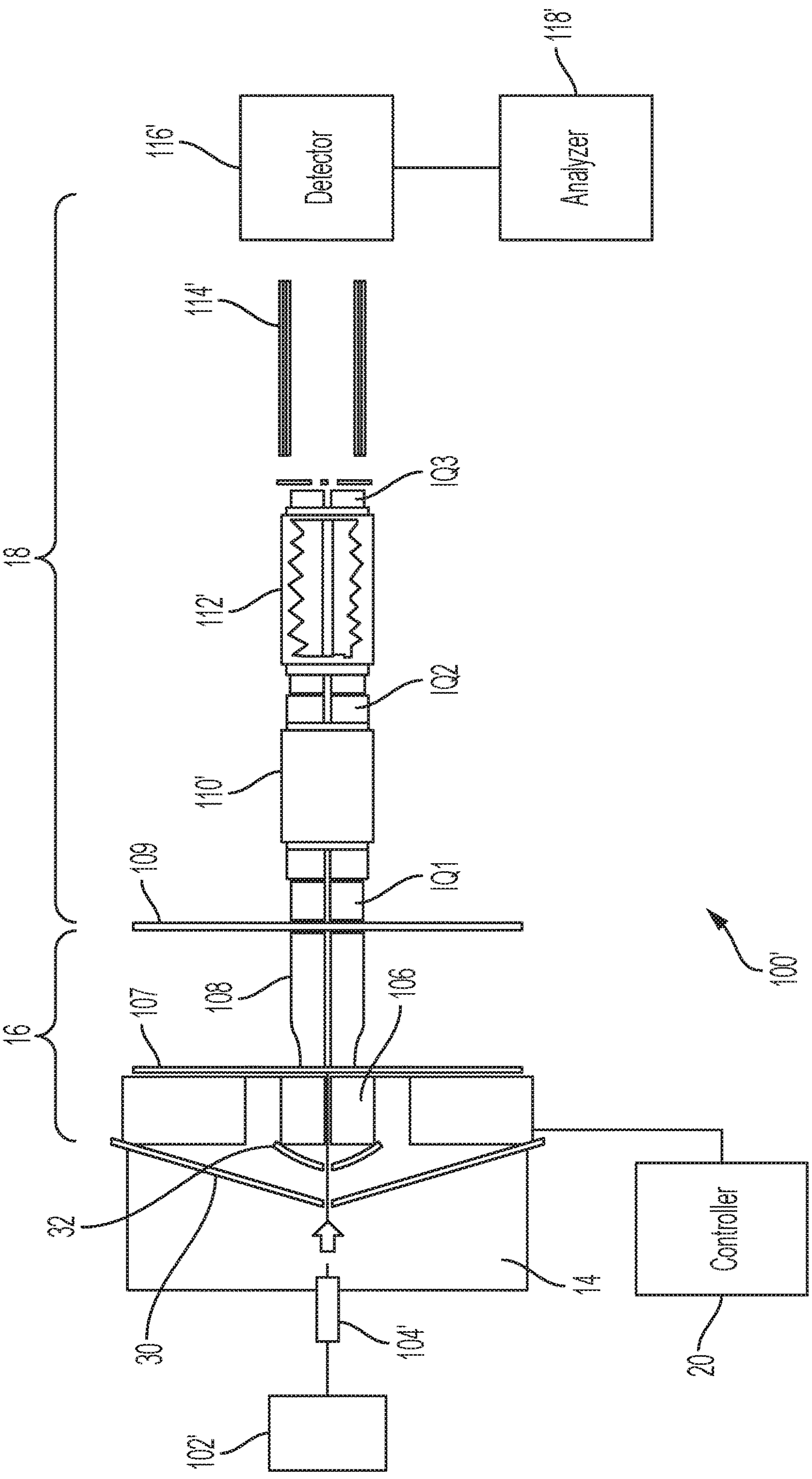

An ion guide according to the present teachings can be incorporated in a variety of mass spectrometers, including, without limitation, quadrupole, time-of-flight spectrometers, and combinations thereof. By way of example, FIG. 7 schematically depicts such a mass spectrometer 100', which comprises an ion source 104' for generating ions within an ionization chamber 14, an upstream section 16 for initial processing of ions received therefrom, and a downstream section 18 containing one or more mass analyzers, collision cell and a mass analyzer 116 according to the present teachings.

Ions generated by the ion source 104' can be successively transmitted through the elements of the upstream section 16 (e.g., curtain plate 30, orifice plate 32, Qjet 106, and Q0 108) to result in a narrow and highly focused ion beam (e.g., in the z-direction along the central longitudinal axis) for further mass analysis within the high vacuum downstream portion 18.

In the depicted embodiment, the ionization chamber 14 can be maintained at an atmospheric pressure, though in some embodiments, the ionization chamber 14 can be evacuated to a pressure lower than atmospheric pressure. The curtain chamber (i.e., the space between curtain plate 30 and orifice plate 32) can also be maintained at an elevated pressure (e.g., about atmospheric pressure, a pressure greater than the upstream section 16), while the upstream section 16, and downstream section 18 can be maintained at one or more selected pressures (e.g., the same or different sub-atmospheric pressures, a pressure lower than the ionization chamber) by evacuation through one or more vacuum pump ports (not shown). The upstream section 16 of the mass spectrometer system 100' is typically maintained at one or more elevated pressures relative to the various pressure regions of the downstream section 18, which typically operate at reduced pressures so as to promote tight focusing and control of ion movement.

The ionization chamber 14, within which analytes contained within the fluid sample discharged from the ion source 104' can be ionized, is separated from a gas curtain chamber by a curtain plate 30 defining a curtain plate aperture in fluid communication with the upstream section via the sampling orifice of an orifice plate 32. In accordance with various aspects of the present teachings, a curtain gas supply can provide a curtain gas flow (e.g., of $N_2$) between the curtain plate 30 and the orifice plate 32 to aid in keeping the downstream section of the mass spectrometer system clean by declustering and evacuating large neutral particles. By way of example, a portion of the curtain gas can flow out of the curtain plate aperture into the ionization chamber 14, thereby preventing the entry of droplets through the curtain plate aperture.

As discussed in detail below, the mass spectrometer system 100' also includes a power supply and controller (not shown) that can be coupled to the various components so as to operate the mass spectrometer system 100' in accordance with various aspects of the present teachings.

As shown, the depicted system 100' includes a sample source 102' configured to provide a fluid sample to the ion source 104'. The sample source 102' can be any suitable sample inlet system known to one of ordinary skill in the art and can be configured to contain and/or introduce a sample (e.g., a liquid sample containing or suspected of containing an analyte of interest) to the ion source 104'. The sample source 102' can be fluidly coupled to the ion source so as to transmit a liquid sample to the ion source 102' (e.g., through one or more conduits, channels, tubing, pipes, capillary tubes, etc.) from a reservoir of the sample to be analyzed, from an in-line liquid chromatography (LC) column, from a capillary electrophoresis (CE) instrument, or an input port through which the sample can be injected, all by way of non-limiting examples. In some aspects, the sample source 102' can comprise an infusion pump (e.g., a syringe or LC pump) for continuously flowing a liquid carrier to the ion source 104', while a plug of sample can be intermittently injected into the liquid carrier.

The ion source 104' can have a variety of configurations but is generally configured to generate ions from analytes contained within a sample (e.g., a fluid sample that is received from the sample source 102'). In this embodiment, the ion source 104' comprises an electrospray electrode, which can comprise a capillary fluidly coupled to the sample source 102' and which terminates in an outlet end that at least partially extends into the ionization chamber 14 to discharge the liquid sample therein. As will be appreciated by a person having ordinary skill in the art in light of the present teachings, the outlet end of the electrospray electrode can atomize, aerosolize, nebulize, or otherwise discharge (e.g., spray with a nozzle) the liquid sample into the ionization chamber 14 to form a sample plume comprising a plurality of micro-droplets generally directed toward (e.g., in the vicinity of) the curtain plate aperture.

As is known in the art, analytes contained within the micro-droplets can be ionized (i.e., charged) by the ion source 104', for example, as the sample plume is generated. In some aspects, the outlet end of the electrospray electrode can be made of a conductive material and electrically coupled to a power supply (e.g., voltage source), which is operatively coupled to the controller 20. The fluid within the micro-droplets contained within the sample plume evaporate during desolvation in the ionization chamber.

Though the ion source 104' is generally described herein as an electrospray electrode, it should be appreciated that any number of different ionization techniques known in the art for ionizing analytes within a sample and modified in accordance with the present teachings can be utilized as the ion source 104'. By way of non-limiting example, the ion source 104' can be an electrospray ionization device, a nebulizer assisted electrospray device, a chemical ionization device, a nebulizer assisted atomization device, a matrix-assisted laser desorption/ionization (MALDI) ion source, a photoionization device, a laser ionization device, a thermospray ionization device, an inductively coupled plasma (ICP) ion source, a sonic spray ionization device, a glow discharge ion source, and an electron impact ion source, DESI, among others.

It will be appreciated that the ion source 102' can be disposed orthogonally relative to the curtain plate aperture and the ion path axis such that the plume discharged from the ion source 104' is also generally directed across the face of the curtain plate aperture such that liquid droplets and/or large neutral molecules that are not drawn into the curtain chamber can be removed from the ionization chamber 14 so as to prevent accumulation and/or recirculation of the potential contaminants within the ionization chamber. In various aspects, a nebulizer gas can also be provided (e.g., about the discharge end of the ion source 102') to prevent the accumulation of droplets on the sprayer tip and/or direct the sample plume in the direction of the curtain plate aperture.

In some embodiments, upon passing through the orifice plate 32, the ions can traverse one or more additional vacuum chambers and/or quadrupoles (e.g., a QJet® quadrupole) to provide additional focusing of and finer control over the ion beam using a combination of gas dynamics and radio frequency fields prior to being transmitted into the downstream high-vacuum section 18.

In accordance with various aspects of the present teachings, it will also be appreciated that the exemplary ion guides described herein can be disposed in a variety of front-end locations of mass spectrometer systems. By way of non-limiting example, the ion guide 108' can serve in the conventional role of a QJet® ion guide (e.g., operated at a pressure of about 1-10 Torr), as a conventional Q0 focusing ion guide (e.g., operated at a pressure of about 3-15 mTorr) preceded by a QJet® ion guide, as a combined Q0 focusing ion guide and QJet® ion guide (e.g., operated at a pressure of about 3-15 mTorr), or as an intermediate device between a QJet® ion guide and Q0 (e.g., operated at a pressure in the 100s of mTorr, at a pressure between a typical QJet® ion guide and a typical Q0 focusing ion guide).

As shown, the upstream section 16 of system 100' is separated from the curtain chamber via orifice plate 32 and generally comprises a first RF ion guide 106' (e.g., QJet® of SCIEX) and a second RF guide 108' (e.g., Q0). In some exemplary aspects, the first RF ion guide 106' can be used to capture and focus ions using a combination of gas dynamics and radio frequency fields. By way of example, ions can be transmitted through the sampling orifice, where a vacuum expansion occurs as a result of the pressure differential between the chambers on either side of the orifice plate 32. By way of non-limiting example, the pressure in the region of the first RF ion guide can be maintained at about 2.5 Torr pressure.

The QJet® 106' transfers ions received thereby to subsequent ion optics such as the Q0 RF ion guide 108' through the ion lens IQ0 107' disposed therebetween. The Q0 RF ion guide 108' transports ions through an intermediate pressure region (e.g., in a range of about 1 mTorr to about 10 mTorr) and delivers ions through the IQ1 lens 109 to the downstream section 18 of system 100'.

The downstream section 18 of system 100' generally comprises a high vacuum chamber containing the one or more mass analyzers for further processing of the ions transmitted from the upstream section 16. As shown in FIG. 6, the exemplary downstream section 18 includes a mass analyzer 110' (e.g., elongated rod set Q1) and a second elongated rod set 112 (e.g., q2) that can be operated as a collision cell. The downstream section further includes a mass analyzer 114' according to the present teachings.

Mass analyzer 110' and collision cell 112' are separated by orifice plates IQ2, and collision cell 112' and the mass analyzer 114' are separated by orifice plate IQ3. For example, after being transmitted from 108 Q0 through the exit aperture of the lens 109 IQ1, ions can enter the adjacent quadrupole rod set 110 (Q1), which can be situated in a vacuum chamber that can be evacuated to a pressure that can be maintained at a value lower than that of chamber in which RF ion guide 107 is disposed.

By way of non-limiting example, the vacuum chamber containing Q1 can be maintained at a pressure less than about $1\times10^{-4}$ Torr (e.g., about $5\times10^{-5}$ Torr), though other pressures can be used for this or for other purposes. As will be appreciated by a person having ordinary skill in the art, the quadrupole rod set Q1 can be operated as a conventional transmission RF/DC quadrupole mass filter that can be operated to select an ion of interest and/or a range of ions of interest.

By way of example, the quadrupole rod set Q1 can be provided with RF/DC voltages suitable for operation in a mass-resolving mode. As should be appreciated, taking the physical and electrical properties of Q1 into account, parameters for an applied RF and DC voltage can be selected so that Q1 establishes a transmission window of chosen m/z ratios, such that these ions can traverse Q1 largely unperturbed.

Ions having m/z ratios falling outside the window, however, do not attain stable trajectories within the quadrupole and can be prevented from traversing the quadrupole rod set Q1. It should be appreciated that this mode of operation is but one possible mode of operation for Q1.

Ions passing through the quadrupole rod set Q1 can pass through the lens IQ2 and into the adjacent quadrupole rod set q2, which can be disposed in a pressurized compartment and can be configured to operate as a collision cell at a pressure approximately in the range of from about 1 mTorr to about 10 mTorr, though other pressures can be used for this or for other purposes. A suitable collision gas (e.g., nitrogen, argon, helium, etc.) can be provided by way of a gas inlet (not shown) to thermalize and/or fragment ions in the ion beam.

In this embodiment, the ions exiting the collision cell 112' can be received by the mass analyzer 114' according to one embodiment of the present teachings. The mass analyzer 114' can be implemented in a variety of different ways. By way of example, the mass analyzer 114' can be implemented as a quadrupole mass analyzer. The application of RF voltages and a resolving DC voltage to the quadrupole rods can provide radial confinement and mass selection of the ions as they pass through the quadrupole. The ions can be detected by a downstream detector 118', which generates ion detection signals in response to the detection of the ions. An analyzer 120' can receive the ion detection signals from the detector and can operate on those signals, in a manner known in the art, to derive a mass spectrum of the detected ions.

Those having ordinary skill in the art will appreciate that various changes can be made to the above embodiments without departing from the scope of the invention.

What is claimed is:

1. An ion guide for use in a mass spectrometer, comprising:

a first plurality of conductive electrodes disposed on a first surface, a second plurality of conductive electrodes disposed on a second surface, wherein said two surfaces are positioned relative to one another so as to provide a passageway having an inlet for receiving an ion beam and an outlet through which ions exit the passageway, said first and second plurality of electrodes being configured for application of RF and/or DC voltages thereto for generating an electromagnetic field within said passageway, an orifice formed in at least one of said surfaces, wherein said two surfaces are shaped such that said passageway comprises an upstream section receiving said ion beam and a downstream section that is offset relative to said upstream section such that one or more target ions in the ion beam travel from said upstream section to said downstream section to exit the passageway and one or more neutral species and/or large ion clusters, when present in the ion beam, exit the passageway through said orifice.

2. The ion guide of claim 1, further comprising a transition section extending from said upstream section to said downstream section.

3. The ion guide of claim 2, wherein said transition section forms a non-zero angle relative to said upstream and downstream sections.

4. The ion guide of claim 2, wherein said orifice is formed in said transition section.

5. The ion guide of claim 1, wherein each of said first and second surfaces comprises a surface of a printed circuit board (PCB).

6. The ion guide of claim 1, wherein said target ions have an m/z ratio in a range of about 50 to about 100,000.

7. The ion guide of claim 1, wherein said large ion clusters have an m/z ratio greater than 100,000.

8. The ion guide of claim 1, further comprising an annular electrode positioned around said orifice and configured for application of a DC voltage thereto for any of facilitating passage of the large ion clusters through said orifice and inhibiting passage of said target ions through said orifice.

9. The ion guide of claim 1, wherein at least one of said electrodes comprises an electrically conductive strip.

10. The ion guide of claim 1, wherein said passageway has a substantially S-shaped profile.

11. An ion guide for use in a mass spectrometer, comprising:

a first plurality of conductive strips disposed on a surface of a first printed circuit board (PCB), wherein said surface is bent to provide at least two sections forming an angle relative to one another, a second plurality of conductive strips disposed on a surface of a second PCB, wherein said surface of the second PCB is bent to provide at least two sections tilted relative to one another, wherein said bent surfaces of the two PCBs are positioned relative to one another so as to provide a passageway having a first section comprising an inlet for receiving ions, said first section extending to a second section that is offset relative to said first section, wherein said conductive strips are configured for application of RF and/or DC voltage(s) thereto for generating an electromagnetic field within said ion passageway, an orifice formed within at least one of said surfaces of the first and second PCBs, wherein said first and second sections of the passageway and said orifice are arranged relative to one another such that one or more target ions received in the first section via said inlet travel under influence of said electromagnetic field to said second section and one or more neutral species and/or large ion clusters, when received via said inlet, exit the passageway through said orifice.

12. The ion guide of claim 11, wherein each of said first and second plurality of conductive strips comprises at least three conductive strips.

13. The ion guide of claim 11, further comprising an intermediate section positioned between upstream and downstream sections.

14. The ion guide of claim 13, further comprising a first transition section connecting said upstream section to said intermediate section and a second transition section connecting said intermediate section to said downstream section.

15. The ion guide of claim 14, wherein any of said first and second transition sections forms a non-zero angle with respect to any of said upstream and downstream sections.

16. The ion guide of claim 15, wherein said non-zero angle is in a range of about 5 to about 180 degrees.

17. The ion guide of claim 11, wherein any of said first and second surfaces comprises a surface of a printed circuit board (PCB).

18. The ion guide of claim 11, wherein said target ions have an m/z in a range of about 50 to about 100,000.

19. The ion guide of claim 11, wherein said large ion clusters have an m/z greater than 20,000.

20. The ion guide of claim 11, wherein a downstream section is substantially parallel to an upstream section.

* * * * *